(12) United States Patent
Oar et al.

(10) Patent No.: US 10,332,314 B2
(45) Date of Patent: Jun. 25, 2019

(54) HANDS-FREE ASSET IDENTIFICATION, LOCATION AND MANAGEMENT SYSTEM

(71) Applicants: CommScope Technologies LLC, Hickory, NC (US); CommScope Connectivity UK Limited, London (GB)

(72) Inventors: Michael Andrew Oar, San Francisco, CA (US); Eric Christopher Braddom, Plano, TX (US); Min Zheng, San Francisco, CA (US); Ramya Poojitha Pendyala, Sunnyvale, CA (US); David Thomas, Chester (GB); Owen Marshall, Wales (GB)

(73) Assignees: CommScope Technologies LLC, Hickory, NC (US); CommScope Connectivity UK Limited, London (GB)

( * ) Notice: Subject to any disclaimer, the term of this patent is extended or adjusted under 35 U.S.C. 154(b) by 22 days.

(21) Appl. No.: 15/309,136

(22) PCT Filed: May 7, 2015

(86) PCT No.: PCT/US2015/029677
§ 371 (c)(1),
(2) Date: Nov. 4, 2016

(87) PCT Pub. No.: WO2015/171887
PCT Pub. Date: Nov. 12, 2015

(65) Prior Publication Data
US 2017/0076504 A1    Mar. 16, 2017

Related U.S. Application Data

(60) Provisional application No. 61/989,938, filed on May 7, 2014.

(51) Int. Cl.
*G06T 19/00* (2011.01)
*H04L 12/24* (2006.01)
(Continued)

(52) U.S. Cl.
CPC .......... *G06T 19/006* (2013.01); *G02B 27/017* (2013.01); *G09G 5/006* (2013.01);
(Continued)

(58) Field of Classification Search
CPC .................................................. G06T 19/006
(Continued)

(56) References Cited

U.S. PATENT DOCUMENTS 7,110,909 B2    9/2006   Friedrich et al.
9,171,209 B2    10/2015  Townend et al.
(Continued)

FOREIGN PATENT DOCUMENTS

KR    1020100128441      12/2010
KR    10-1058451 B1      8/2011
(Continued)

OTHER PUBLICATIONS

European Patent Office, "European Office Action for EP Application No. 13752208.2", "Foreign Counterpart to U.S. Appl. No. 13/775,798", dated Mar. 31, 2017, pp. 1-5, Published in: EP.
(Continued)

*Primary Examiner* — Ryan R Yang
(74) *Attorney, Agent, or Firm* — Fogg & Powers LLC

(57) ABSTRACT

A hands-free asset management system and a method of its operation are disclosed. An example system includes an asset tracking database storing an asset location and one or more identifying characteristics of each of a plurality of networking assets, and an application executable on a wearable display device communicatively connected to the asset tracking database. The application is executable to receive a
(Continued)

work order associated with at least one asset among the plurality of networking assets, based on a location of the wearable display device and the work order, display one or more directions to the asset for a wearer of the wearable display device, and display one or more work instructions to be performed on the asset.

19 Claims, 18 Drawing Sheets

(51) Int. Cl.
| | |
|---|---|
| *G02B 27/01* | (2006.01) |
| *G09G 5/00* | (2006.01) |
| *H04L 12/26* | (2006.01) |
| *H04W 4/02* | (2018.01) |
| *H04B 1/3827* | (2015.01) |

(52) U.S. Cl.
CPC ...... *H04L 41/0866* (2013.01); *H04L 43/0811* (2013.01); *H04W 4/02* (2013.01); *G02B 2027/014* (2013.01); *G02B 2027/0138* (2013.01); *G02B 2027/0141* (2013.01); *G02B 2027/0178* (2013.01); *G06T 2215/16* (2013.01); *G09G 2370/022* (2013.01); *H04B 2001/3866* (2013.01); *H04M 2250/10* (2013.01)

(58) Field of Classification Search
USPC .................................................. 345/632, 633
See application file for complete search history.

(56) References Cited

U.S. PATENT DOCUMENTS

| | | | |
|---|---|---|---|
| 9,210,049 B2 | 12/2015 | Polland | |
| 9,679,437 B2 | 6/2017 | Detlefsen et al. | |
| 2004/0105006 A1* | 6/2004 | Lazo | G01S 3/7864 348/169 |
| 2006/0033753 A1 | 2/2006 | Lai | |
| 2007/0273610 A1 | 11/2007 | Baillot | |
| 2008/0068267 A1* | 3/2008 | Huseth | G01S 5/0072 342/465 |
| 2008/0255902 A1 | 10/2008 | Poer et al. | |
| 2009/0287587 A1 | 11/2009 | Bloebaum et al. | |
| 2011/0170524 A1* | 7/2011 | Arslan | G01S 5/0252 370/338 |
| 2011/0221771 A1* | 9/2011 | Cramer | G06Q 30/02 345/633 |
| 2012/0116728 A1 | 5/2012 | Shear et al. | |
| 2012/0201277 A1* | 8/2012 | Tanner | G06Q 10/08 375/141 |
| 2012/0249588 A1* | 10/2012 | Tison | G06F 1/1696 345/633 |
| 2013/0117377 A1 | 5/2013 | Miller | |
| 2013/0169681 A1* | 7/2013 | Rasane | G06T 19/006 345/633 |
| 2013/0314210 A1* | 11/2013 | Schoner | G06K 7/10366 340/8.1 |
| 2014/0089028 A1 | 3/2014 | Marshall et al. | |
| 2014/0111346 A1 | 4/2014 | Pinn et al. | |
| 2015/0310279 A1* | 10/2015 | Bare | G06K 9/00671 345/633 |
| 2015/0339453 A1* | 11/2015 | Richards | G06T 11/00 345/633 |
| 2015/0363977 A1* | 12/2015 | Chui | H04N 7/0125 345/633 |
| 2016/0071325 A1* | 3/2016 | Callaghan | G06T 19/006 345/633 |
| 2016/0248635 A1 | 8/2016 | Townend et al. | |

FOREIGN PATENT DOCUMENTS

| | | |
|---|---|---|
| KR | 1020110095443 | 8/2011 |
| WO | 2012018470 | 2/2012 |
| WO | 2014/032168 A1 | 3/2014 |

OTHER PUBLICATIONS

U.S. Patent Office, "Notice of Allowance", "from U.S. Appl. No. 13/775,798", dated Jun. 23, 2015, pp. 1-7, Published in: US.
U.S. Patent Office, "Notice of Allowability", "from U.S. Appl. No. 13/775,798", dated Sep. 10, 2015, pp. 1-5, Published in: US.
U.S. Patent Office, "Office Action", "from U.S. Appl. No. 13/775,798", dated Jan. 30, 2015, pp. 1-13, Published in: US.
International Search Authority, "International Search Report and Written Opinion for PCT Application No. PCT/US2013/027654", dated Jun. 14, 2013, pp. 1-10, Published in: WO.
International Search Authority, "International Search Authority and Written Opinion for PCT Application No. PCT/EP2013/064667", dated Nov. 7, 2013, pp. 1-5, Published in: WO.
International Search Report and Written Opinion of the International Searching Authority for International Patent Application No. PCT/US2015/029677 dated Jul. 28, 2015, 10 pgs.
European Patent Office, "Communication Pursuant to 94(3) for EP Application No. 13752208.2", "Foreign Counterpart to U.S. Appl. No. 13/775,798", Dated Mar. 21, 2018, pp. 1-16, Published in: EP.
U.S. Patent and Trademark Office, "Office Action for U.S. Appl. No. 14/923,170", Dated Mar. 22, 2018, pp. 1-23, Published in: US.
U.S. Patent and Trademark Office, "Non-Final Office Action from U.S. Appl. No. 14/923,170 dated Sep. 19, 2018", pp. 1-23, Published in: US.
U.S. Patent and Trademark Office, "Notice of Allowance", U.S. Appl. No. 14/923,170, dated Apr. 17, 2019, pp. 1-16, Published: US.

\* cited by examiner

HANDS-FREE ASSET IDENTIFICATION, LOCATION AND MANAGEMENT SYSTEM

CROSS-REFERENCE TO RELATED APPLICATION(S)

This application is a U.S. National Stage of PCT/US2015/029677, filed on May 7, 2015, which claims benefit of U.S. Patent Application Ser. No. 61/989,938 filed on May 7, 2014, and which applications are incorporated herein by reference. To the extent appropriate, a claim of priority is made to each of the above disclosed applications.

TECHNOLOGICAL FIELD

The present disclosure relates generally to a system for determining locations of network assets, such as network connections. In particular, the present disclosure relates to a hands-free asset identification, location, and management system.

BACKGROUND

Large-scale networks and facilities typically include assets of a variety of types which are placed at a variety of locations. For example, a network that is maintained by a telecommunications provider or facility may include networking equipment, such as patch panels, routers, or other networking equipment, in a single rack, in different racks, and across different rooms, buildings, or other locations. Each of these network assets may in turn also include other assets, such as available or occupied network jacks or other network connections usable to route signals among network devices.

Often, a technician is required to service network assets, for example by configuring network connections at a field location. Often, that servicing requires the technician to disconnect and reconnect networking cables, or to otherwise locate, identify and service specific network jack locations or other network assets. When a technician modifies a configuration of equipment (e.g., patch panels) in data centers or splitter nodes in outside environments, it is important to ensure that the technician has located the correct piece of equipment. If the technician identifies the wrong asset for configuration, or does not know how to modify the asset as needed, costly mistakes can happen.

Currently, technicians are required to rely on labeling of network assets, and must correlate those networking locations to change networking configurations, or to otherwise service network assets. When relying on such labeling, it is not uncommon for the technician to incorrectly configure network assets, for example by inserting a plug into the incorrect jack of a patch panel, thereby providing erroneous routing, and resulting in such costly mistakes.

In other types of facilities or circumstances where locations of components of a system are generally constant but of a high number, similar challenges apply. For example, when servicing a vehicle or other types of electronic or mechanical equipment having a large number of possible components that are required to be accessed and adjusted, it can be difficult to determine which components are interconnected, and what electrical components (e.g., fuses, breakers, etc.) are associated with different electrical and/or mechanical subsystems.

Still further difficulties exist in assessing and locating assets, in particular because in many cases maps or networking diagrams are required, which involve cross-referencing paper or electronic diagrams to real-world asset locations. This typically complicates the location and maintenance process, both because of the cross-referencing required and the fact that a technician's hands are typically occupied with maintenance services. Still further, identification and location of such assets, particularly those kept indoors at networking facilities, can be difficult absent such physical or electronic diagrams, since typically a large number of networking or computing assets are housed in a common location (and are difficult to distinguish from one another).

Accordingly, improvements in tracking of assets, including racks, panels, and even networking connections are desirable.

SUMMARY

In accordance with the following disclosure, the above and other issues are addressed by the following:

In a first aspect, a hands-free asset management system is disclosed. An example system includes an asset tracking database storing an asset location and one or more identifying characteristics of each of a plurality of networking assets, and an application executable on a wearable display device communicatively connected to the asset tracking database. The application is executable to receive a work order associated with at least one asset among the plurality of networking assets, based on a location of the wearable display device and the work order, display one or more directions to the asset for a wearer of the wearable display device, and display one or more work instructions to be performed on the asset.

In a second aspect, a method of tracking networking assets includes receiving, at an application executing on a wearable display device, a work order associated with at least one asset among a plurality of networking assets stored in an asset tracking database, each of a plurality of records associated with the plurality of networking assets including an asset location and one or more identifying characteristics of that asset. The method also includes, based on a location of the wearable display device and the work order, displaying one or more directions to the asset for a wearer of the wearable display device. The method further includes displaying one or more work instructions to be performed on the asset based on the work order.

In a third aspect, an application installable on a wearable display device for execution to manage networking assets, the application including a plurality of executable instructions stored in a memory of the wearable display device. When executed, the instructions cause the wearable display device to perform a method including receiving a work order associated with at least one asset among a plurality of networking assets stored in an asset tracking database, each of a plurality of records associated with the plurality of networking assets including an asset location and one or more identifying characteristics of that asset, based on a location of the wearable display device and the work order, displaying one or more directions to the asset for a wearer of the wearable display device, and displaying one or more work instructions to be performed on the asset based on the work order.

In a further aspect, an asset location system includes a mobile application component executable on a mobile device including a camera and a display, the mobile application component configured to receive image data from the camera and display an image on the display based on the image data and overlay information identifying one or more assets identifiable in the image data. The asset location system also includes an asset management tracking engine configured to receive the image data and generate the overlay information including an identification of a location of at least one of the one or more assets within the image.

In a further aspect, a network asset location system includes a mobile application component executable on a mobile device including a camera and a display. The mobile application component is configured to receive image data from the camera and display an image on the display identifying one or more network assets identifiable in the image data. The network asset location system includes a plurality of identifiers associated with the one or more network assets each positioned at a known location relative each of the plurality of identifiers. The network asset location system also includes an asset management tracking engine configured to receive the image data and generate the overlay information including an identification of a location of at least one of the one or more network assets within the image.

In a further aspect, a method of determining an asset location using an application executing on a mobile device having a camera and a display is disclosed. The method includes capturing image data of a network asset using the camera of the mobile device, the image data including information regarding a plurality of identifiers associated with the network asset and positioned at a predetermined location relative to the network asset. The method also includes displaying an image including overlay information identifying the network asset and a location of the network asset within the image.

In a further aspect, a method of determining an asset location using a network asset management engine is disclosed. The method includes receiving image data including image data relating to a network asset, the image data also including information regarding a plurality of identifiers associated with the network asset and positioned at a predetermined location relative to the network asset. The method also includes determining an identity of the network asset based at least in part on recognition of the plurality of identifiers and a relative position of the network asset relative to the plurality of identifiers in the image data. The method further includes generating overlay information identifying a location and an identity of the network asset in the image data.

DETAILED DESCRIPTION

Figure 1:
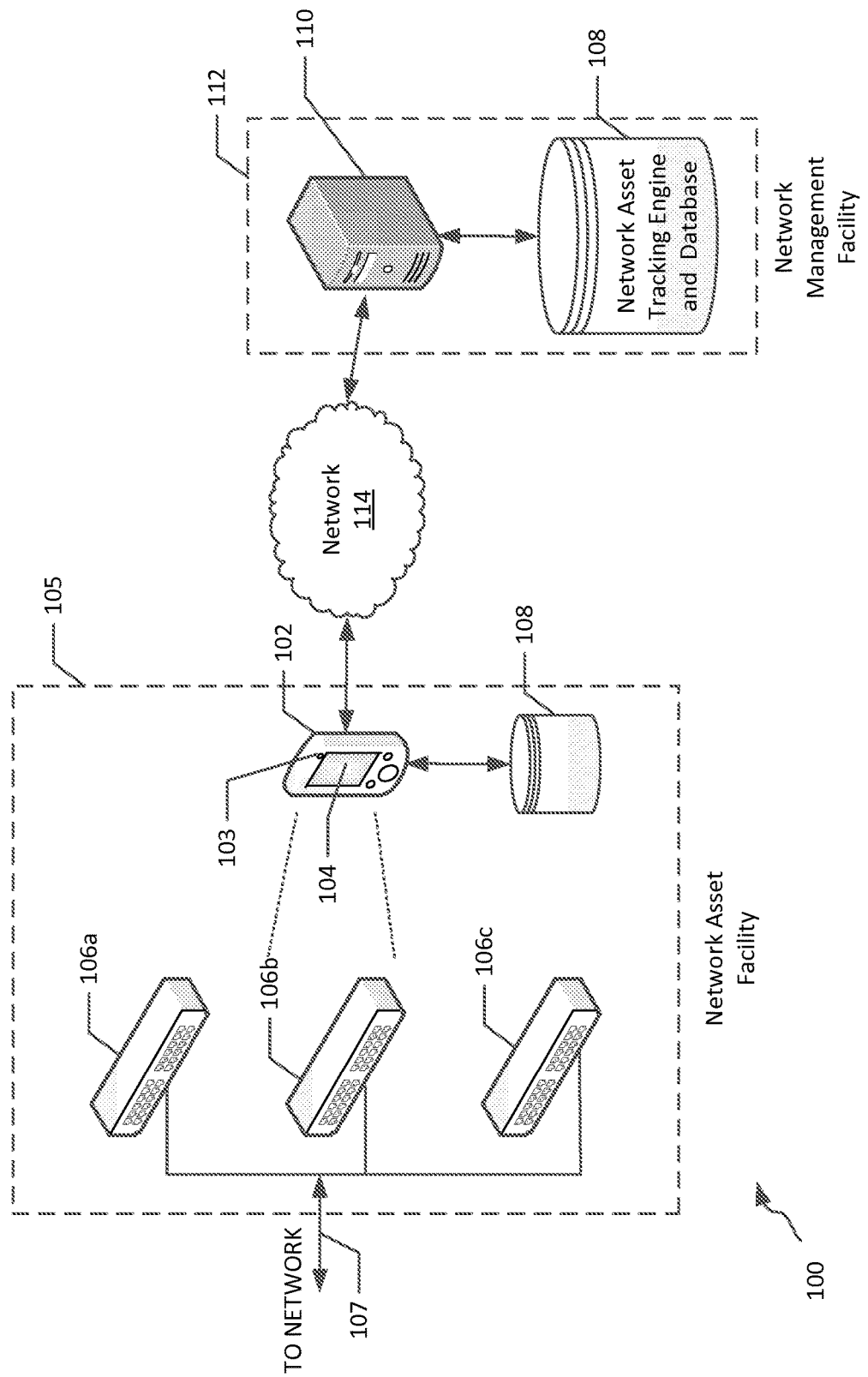
FIG. 1 illustrates an example network asset location system used in conjunction with a distributed networking system in which aspects of the network asset location system of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting; and merely set forth some of the many possible embodiments for the claimed invention.

In general, the present disclosure relates to a network asset identification, location, and management system that can be used to identify assets to a technician user, and provide direction as to their interconnection, location, and maintenance. In certain embodiments, the present disclosure describes an application operating on a mobile device having a camera and a display, and can capture image information (e.g. video information), and overlay an identification of a particular asset of interest on that video data when displayed on the display. For example, if the asset of interest is a network asset, the overlay information could be used to identify to the technician a correct network asset (e.g., a network jack or other connectivity element, panel, or portion of a panel, network switch, subrack, network blade or rack) to be serviced. In other embodiments, any of a variety of different electrical or mechanical systems could be identified. In some embodiments, that user can see this overlay information using a realtime, overlay-augmented display.

In various embodiments discussed herein, the mobile device used to present overlay information can be a mobile computing device or a wearable display device. Accordingly, the overlay can correspond to either addition of supplemental information to a display of previously captured information (e.g., as would be presented on a display of a tablet or smartphone) or could alternatively correspond to projection of supplemental information onto a semitransparent display, such that the projected supplemental information is viewed in conjunction with background scenes (e.g., via a "heads up display" or other type of display).

Referring now to FIG. 1, an example network asset location system 100 used in conjunction with a distributed networking system is shown, in which aspects of the network asset location system of the present disclosure can be implemented. The network asset location system 100 can include, in the embodiment shown a mobile device 102 on which a mobile application component resides, and which can execute the mobile application component. The mobile device 102 can be, in various embodiments, any mobile device including a camera 103 and a display 104, such as a smartphone or tablet computing system. The mobile application component includes program instructions executable on the mobile device 102, and is configured to receive image data from the camera 103 and display an image on the display 104 of the captured image.

In the embodiment shown, the mobile device 102 can be used at a network asset facility 105, which is generally a location where networking equipment is stored. In the embodiment shown, the network asset facility 105 can be a data center or other outside plant application, and can include a plurality of pieces of networking equipment 106, which can, in various applications, include patch panels, data center racks, servers, or other networking equipment. In the context of the present disclosure, any piece of networking equipment or access point provided by such equipment (e.g., telecommunications jacks made available on such patch panels or routers, fiber optic connections, or other physical network access connections) are considered "network assets" which can be configured and provide network data access to subscriber endpoints in a data network.

In the embodiment shown, a plurality of patch panels 106a-c are shown, each of which has a plurality of telecommunications jacks. In accordance with the present disclosure, each of the patch panels 106a-c, or each telecommunications jack, or both, could correspond to a network asset. The patch panels are, in the embodiment shown, included within an overall network 107, which is the network administered and maintained by the technician using the network asset location system 100 of the present disclosure.

In certain embodiments, and as discussed in further detail below in connection with FIGS. 3-8, groups of assets (e.g., patch panels within a particular rack or other device) can be associated with a plurality of identifiers, such that locations of assets that may be difficult to correctly identify (e.g., telecommunications jacks) can be located by triangulation or other relative location calculation procedures. In particular embodiments, the various network assets can include, for example, managed patch panels, such as are described in U.S. Provisional Patent Application No. 61/706,460, filed on Sep. 27, 2012, and entitled "Mobile Application for Assisting a Technician in Carrying Out an Electronic Work Order", and U.S. patent application Ser. No. 13/775,798, filed on Feb. 25, 2013 and entitled "Overlay-Based Asset Location and Identification System", the disclosures of both of which are hereby incorporated by reference in their entireties.

The network asset location system 100 also includes, in the embodiment shown, an asset management tracking engine 108. The asset management tracking engine can, in certain embodiments, reside within a memory of the mobile device 102; in alternative embodiments, the asset management tracking engine 108 can reside at a remote location from the mobile device 102, such as on a server 110 at a network management facility 112. In such embodiments, the mobile device 102 can be configured with a data connection to the server 110, for example via a network 114 (which can include the Internet, as well as any of a number of different types of wireless data networks, such as GSA, SMS, GPRS, EDGE, CDMA, WiFi, WiMax, LTE networks). In some embodiments, data and/or analysis components of the asset management tracking engine 108 (as illustrated in the example shown in FIG. 2) can be stored at one or both locations (i.e., either at a server 110 or on a mobile device 102).

Figure 2:
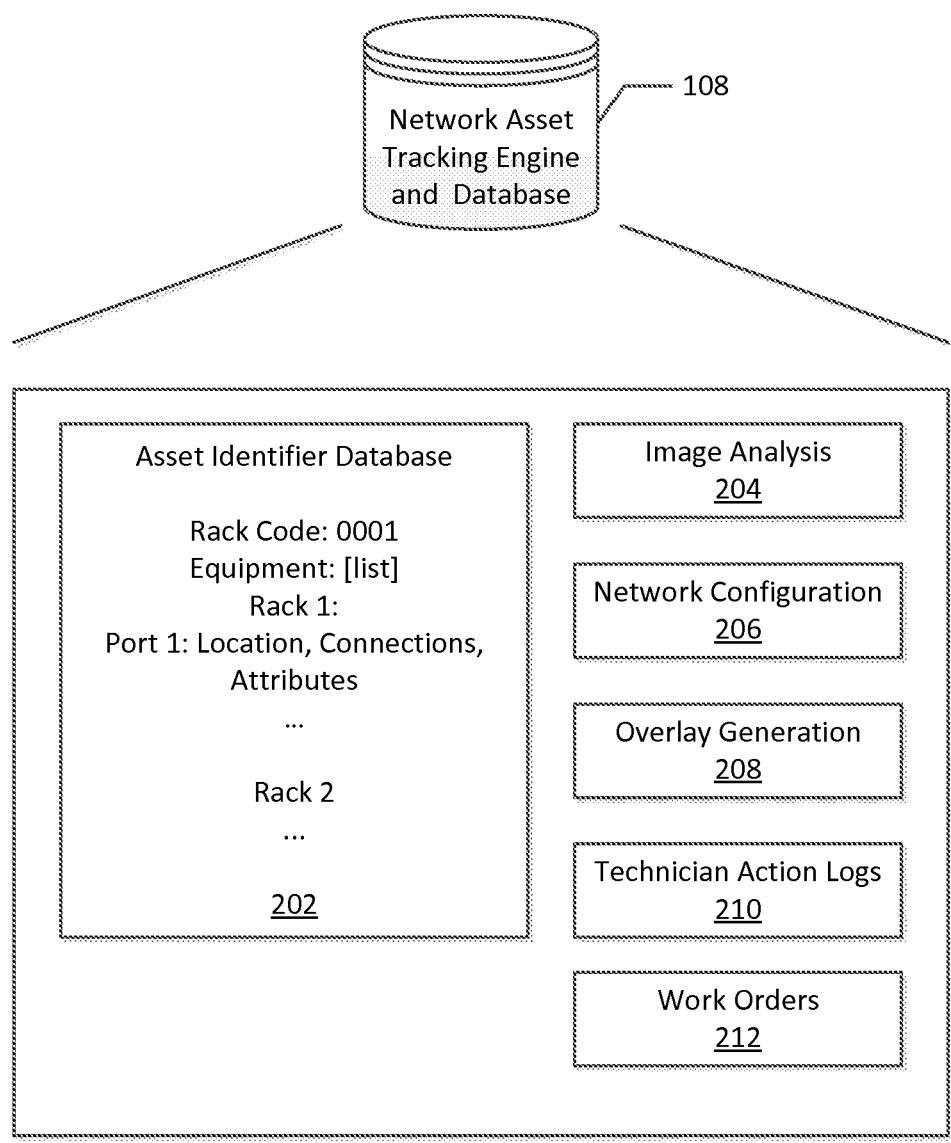
FIG. 2 illustrates an example logical block diagram of a network asset tracking engine usable within a network asset location system, according to a possible embodiment of the present disclosure.

FIG. 2 illustrates an example logical block diagram of a network asset tracking engine 108 usable within a network asset location system, according to a possible embodiment of the present disclosure. The engine 108 generally analyzes image data received from a camera, and generates display information that can identify network assets, identify a location of network assets within an image, and generate an overlay indicating such information to a user by displaying combined image data and overlay information on the display of the mobile device 102.

In the embodiment shown, the network asset tracking engine 108 includes an asset identifier database 202, as well as an image analysis module 204, a network configuration module 206, an overlay generation module 208, and optionally an action log 210 and a work order listing 212.

The asset identifier database 202 stores information regarding each network asset to be tracked by the network asset location system 100. In the embodiment shown, example records are illustrated in the asset identifier database; specifically, each asset can have associated with it a particular location and properties. The location can be a location relative to an identifier near that asset, as illustrated in further detail below in connection with FIGS. 3-6. The location can also include information about a particular asset location at which the asset can be found. The properties associated with the asset can include, for example: an asset identifier, an asset description (e.g., telecommunications jack), associated assets (e.g., a patch panel or rack in which the jack is found), and current connections through that asset (e.g., whether a particular jack has a plug inserted into that jack). Although the particular properties may vary by asset or type of asset (e.g., a jack, a panel, a rack, a router, etc.), generally the records in the database provide a definition of the asset and how to identify it in an image of an overall group of one or more assets that may be captured in an image taken by a camera of a mobile device.

In certain embodiments, as discussed in further detail below, identification of the asset can correspond to an image recognition process relating to both the asset and to a location identifier associated with a group of one or more assets that uniquely define those assets. Examples of such an identifier are discussed in further detail below in connection with FIGS. 3-8.

The image analysis module 204 analyzes image data received from a camera of the mobile device 102, and accesses information in the asset identifier database 202 to detect identifiers in the image data and determine a corresponding asset identification. The image analysis module 204 can also identify particular related assets that are required to be serviced if the asset identifiers are not uniquely associated with the asset to be serviced. For example, asset identifiers may be placed on a particular networking equipment rack, but a specific telecommunications jack on a particular panel within that rack may require service. Accordingly, this related asset to the asset directly identified by the asset identifiers can be detected by comparison to the asset identifiers, and based on a known relative location of that asset to the asset identifiers as included in the asset identifier database 202. For example, if three or more identifiers are viewable within the image, the image analysis module could apply one or more triangulation algorithms to determine the location of a particular network asset. In another embodiment, one or more features within an identifier (e.g., if the identifier includes one or more images) can be used to determine relative distance, orientation, and location, using the image analysis module. Other location-based algorithms are possible as well, for example using WiFi triangulation or GPS techniques as discussed below.

The network configuration module 206 can optionally be included in the network asset tracking engine 108, and in the embodiment shown determines actions required to be performed by a technician. The overlay generation module 208 generates overlay information to be displayed with the image data on a display of the mobile device, and can include, for example: information identifying a particular asset; information identifying related assets; information identifying a particular action to be taken by a technician (e.g. as determined by the network configuration module 206), and other guidance as needed for the technician to service the equipment at the network asset facility (e.g., instructions for configuring the asset). Such information can include, for example, specific steps to be taken to configure a particular asset being identified. For example, information can be generated for delivery to a mobile device 102 to instruct a technician to connect or disconnect a particular plug or wire from a specific socket or connection, or step-by-step instructions for programming a programmable panel, replacing a blown fuse or resetting a tripped circuit breaker, or other options. Embodiments of the present disclosure can, based on generation of such information for display, present to a user very complex steps or installations that would otherwise involve consultation of reference materials. For example, in such embodiments, a multi-step installation process may be guided by instructions and/or video demonstrations of proper technique or routing information that may be involved with an installation.

Figure 5:
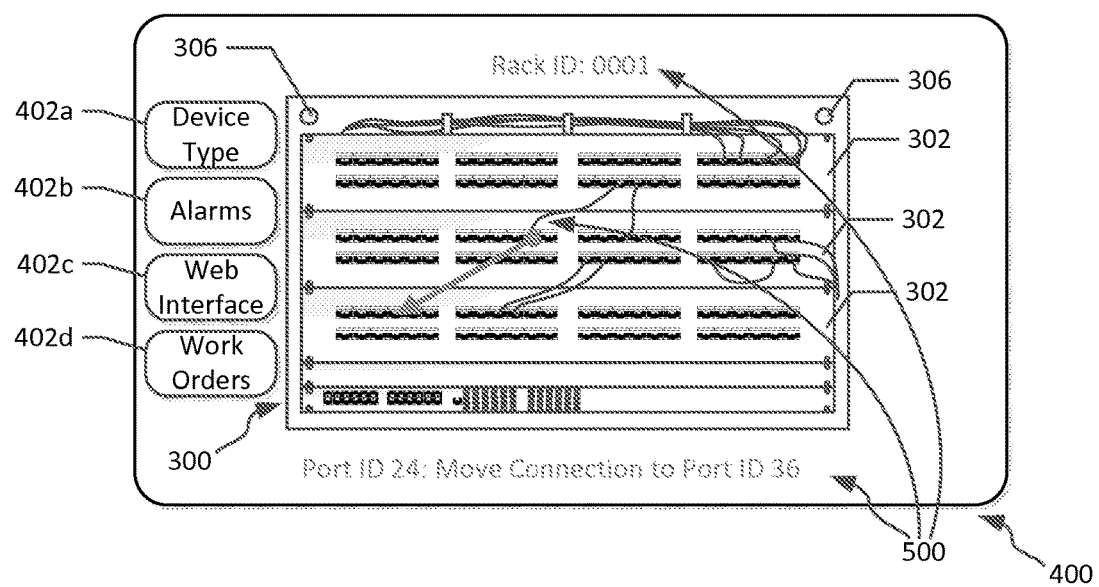
FIG. 5 is a schematic diagram illustrating an example display on a mobile device illustrating the tracked network asset and an overlay provided based on identification of the tracked network asset, according to a possible embodiment of the present disclosure.

Additionally, the overlay information can include, for example, additional details regarding operation of the particular asset. In the case of a network asset such as a rack system or switch, information such as a traffic load, power consumption, internal temperature, or memory usage could be provided in the overlay information, as well as a display of memory usage, available services at the device (or a particular port of the device). Additionally, a number of ports or jacks actively in use, or system utilization, could be displayed. A generalized example of such overlay information is illustrated in FIG. 5.

The action log 210 stores received actions as entered by the technician, based, for example, on the technician following the guidance provided by the overlay information displayed with the image on the mobile device. For example, the action log can store a technician-entered report indicating movement of a telecommunications plug from a first identified jack to a second identified jack, based on guidance provided in the overlay. Alternatively, the action log 210 can store information based on other feedback mechanisms, for example based on a confirmation via the network itself that a connectivity change has been made (e.g., by transmitting a polling query to the newly-connected port, determining that additional or different endpoints can be reached based on a changed network configuration, or other mechanisms).

The work order listing 212 stores open work orders associated with maintenance, repairs or reconfigurations required of a technician, and includes identifications of particular asserts and operations to be performed on those assets. In example embodiments, the work order listing 212 can include information associated with changes to particular configurations, as well as steps to accomplish such changes in configuration. Such steps can be, as discussed below, presented to a user on a step-by-step basis.

Referring now to FIGS. 3-8, example schematic illustrations of operation of the network asset location system 100 is shown, from the perspective of a technician at a particular network asset location (e.g., location 105 of FIG. 1).

Figure 3:
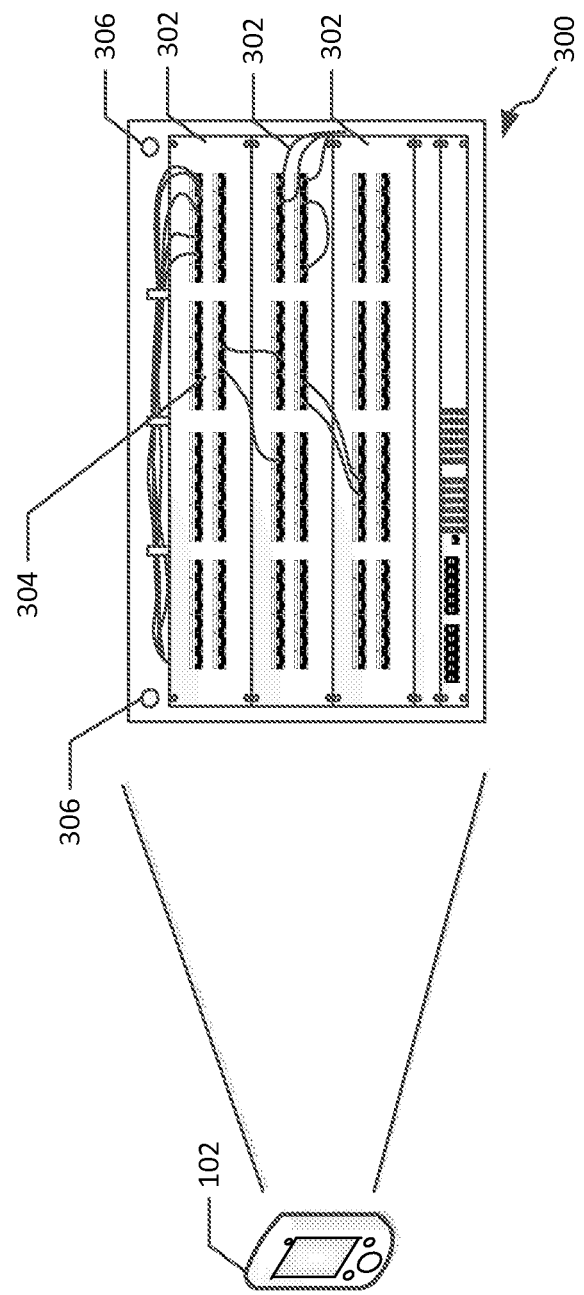
FIG. 3 is a schematic diagram illustrating an example arrangement for tracking network assets, according to a possible embodiment of the present disclosure.
Figure 4:
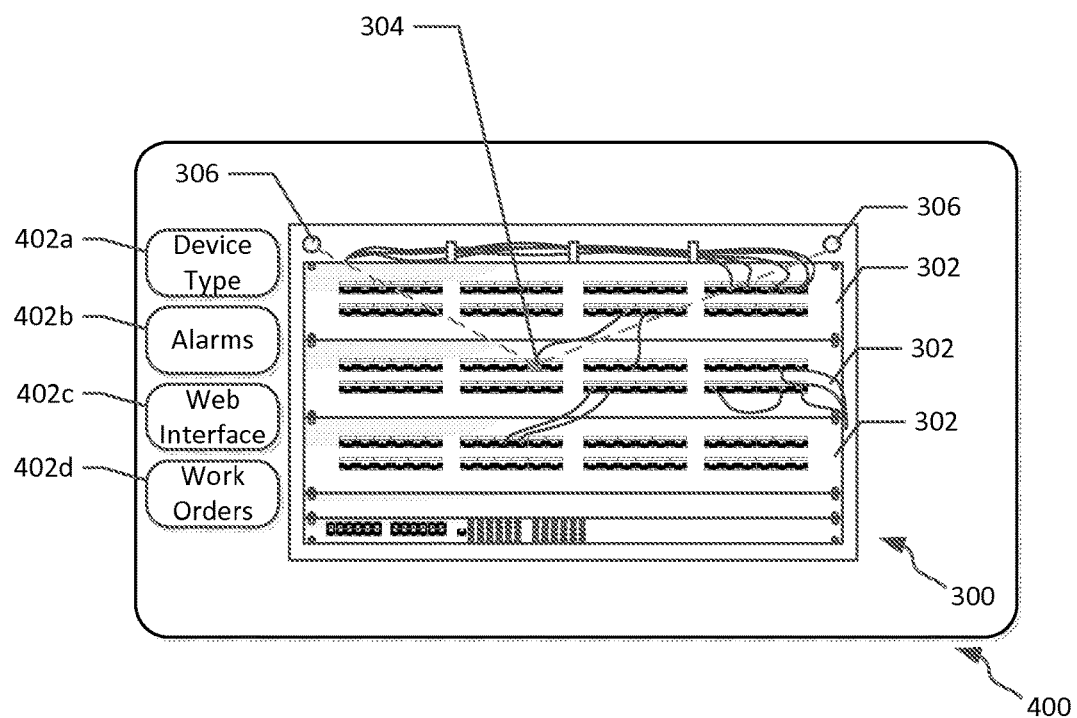
FIG. 4 is a schematic diagram illustrating an example display on a mobile device illustrating the tracked network asset, according to a possible embodiment of the present disclosure.

FIG. 3 is a schematic diagram illustrating an example arrangement for tracking network assets, according to a possible embodiment of the present disclosure, while FIG. 4 illustrates an example display 400 of those network assets captured as shown in FIG. 3, as well as a depiction of triangulation to determine locations and identities of related assets. FIG. 5 illustrates the example display 400 including additional overlay information as determined using the asset management tracking engine 108.

Referring now to FIGS. 3-4, in the embodiment shown the technician activates a mobile application on a mobile device 102 to capture image data regarding a particular network asset. In this example, the technician is capturing video image data of a telecommunications rack 300 including a plurality of patch panels 302 and associated telecommunications jacks 304; however, in other embodiments, other types of telecommunications equipment can be viewed.

As briefly discussed above, a set of identifiers 306 are affixed to the telecommunications equipment, and uniquely identify the telecommunications equipment. In the embodiment shown, the set of identifiers are placed at predetermined locations on the telecommunications rack; however, in alternative embodiments, separate identifiers could be used for each of the patch panels 302 or other network assets.

In various embodiments, the set of identifiers can uniquely identify the telecommunications equipment that they are attached to or otherwise associated with in a number of ways. For example, the identifiers 306 can be light emitting diodes associated with a switching controller such that they are configured to emit light representing a bit code that corresponds to an ID of the rack 300.

In alternative embodiments, the identifiers 306 can be bar codes, QR codes, or images that are unique and associated with particular telecommunications equipment. In other embodiments, NEF, RFID, or other fiducial markings of known size and/or configuration could be used. For example, a particular image may have a known scale and orientation relative to an asset; as such, the recognized size and orientation of the image can be scaled and relative position determined to derive the relative location of an asset to that image. In still other embodiments, one or more liquid crystal displays could be used as an identifier; corresponding targeting arrangements could be used in that circumstance as well.

It is noted that, in an application associated with telecommunications equipment in data centers, it may be possible that low-light conditions make such image-based identification more difficult. In such applications, it may be advisable to use the above-described flashing LED configuration, or an LCD display with adjustable brightness levels. Alternatively, a constant LED flash light included with a camera of a mobile device could be used to illuminate image-based identifiers.

As illustrated in particular in FIG. 4, it is noted that although the identifiers may be associated with one particular piece of equipment (e.g., rack 300) it may be the case that a technician may need to identify and service a particular telecommunications jack or other subcomponent of that equipment. In such cases, a network asset tracking engine 108 stores information regarding relative locations of the subcomponent to the identifiers, allowing the network asset tracking engine 108, and in particular the image analysis module 204, to triangulate to the subcomponent, thereby identifying the subcomponent that is the asset.

In the embodiment shown, the display 400 of the telecommunications rack includes a plurality of navigation buttons 402*a-d*, and additionally includes various touchscreen functionality usable to both view and provide information about the asset being reviewed. For example, in the embodiment shown, the navigation buttons 402*a-d* include a device type button 402*a*, an alarms button 402*b*, a web interface button 402*c*, and a work orders button 402*d*. The navigation buttons 402*a-d* can, in some embodiments, be used in conjunction with a user selecting a particular piece of identified equipment as discussed herein (e.g., a rack, panel, or a particular connection on a panel) to identify specific information regarding that equipment. For example, the device type button 402*a* allows the user to obtain additional details about a selected asset, such as its asset label, the type of equipment, associated assets (e.g., a network in which the asset is connected, or routing information associated with the asset), capacity, usage, or other information. The alarms button 402*b* can be used to either display alarms associated with the particular asset that is selected, or to view all alarms within a network. The web interface button 402*c* can be used to allow the user to log in to a web interface that provides a control panel for the selected asset, particularly in the case of a panel or rack, to allow the user to view operational parameters (e.g., workload, temperature, logs, etc.) of the asset.

Additionally, the work orders button 402*d* can be selected to display pending work orders, for example work orders associated with one or more assets recognized in the image captured by the mobile device 102, or generally within a network configured to be tracked by the mobile device. Each electronic work specifies one or more steps that are to be carried out by a technician at a particular location. For example, an electronic work order can indicate that one or more connections implemented on a patch panel (e.g., panels 106*a-c* above). A menu displayed following selection of the work orders button 402*d* can also allow the user to create a work order associated with one or more assets of interest and identified on the display 400. In such embodiments, the user can, for example, select first and second ports by capturing images of the equipment including those ports, and tapping on the ports to receive an identification thereof from server 110. The user can then define one or more actions to take with respect to the equipment (e.g., connecting a cable between specified ports of specified panels, or other actions), which is confirmed at the server 110, which can be configured to verify that the specified connection has been added, removed, and/or changed correctly based on communication with the associated asset. An example work order definition process is illustrated in U.S. patent application Ser. No. 13/683,866, entitled "Intelligent Infrastructure Management User Device", filed on Nov. 21, 2012, the disclosure of which is hereby incorporated by reference in its entirety.

Figure 6:
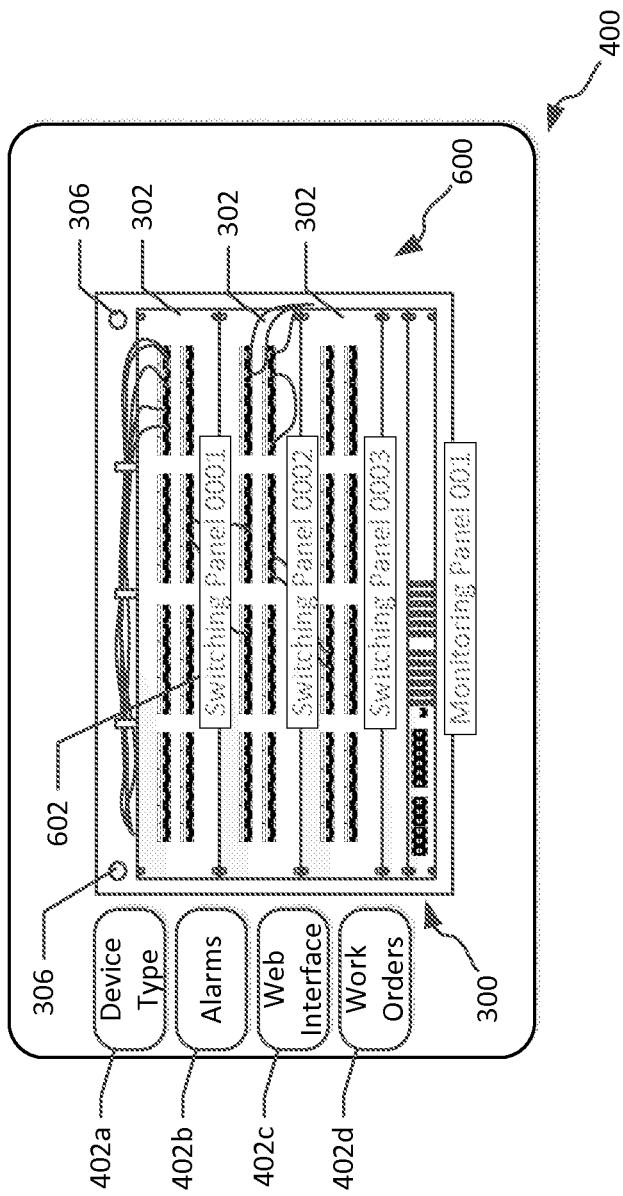
FIG. 6 is a schematic diagram illustrating an example display on a mobile device illustrating the tracked network asset and an overlay that provides asset identification information displayable to a user, according to a possible embodiment of the present disclosure.
Figure 7:
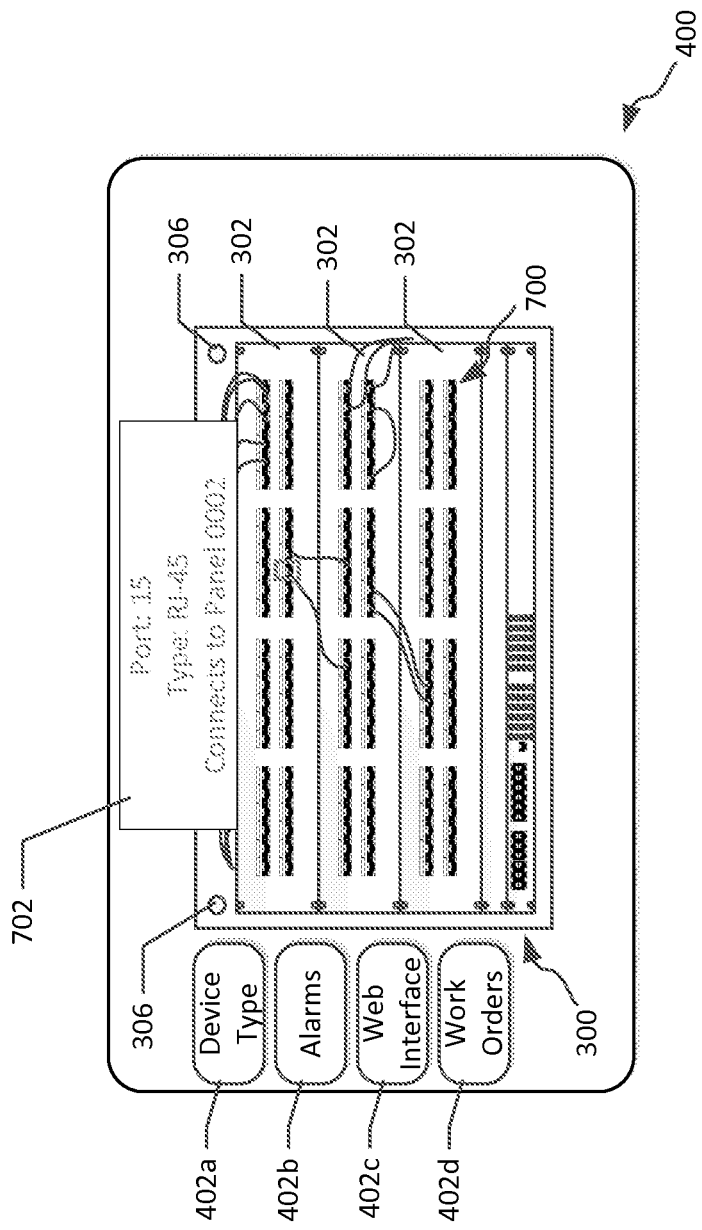
FIG. 7 is a schematic diagram illustrating an example display on a mobile device illustrating asset detail information displayable to a user, according to a possible embodiment of the present disclosure.

Now referring to FIGS. 5-7, various example user interfaces are shown, presented on display 400, for presenting asset and associated overlay information associated with a work order or device identification. As illustrated in FIG. 5, based on the image captured and analyzed, a display 400 of a mobile device 102 can include not only the image illustrated in FIG. 4, but also overlay information 500 identifying one or more assets visible in the image, as well as information about those assets, such as service to be provided. In the embodiment shown, the overlay information 500 identifies a telecommunications jack to which a plug is connected, as well as a second telecommunications jack that is intended to receive that plug. Because the identifiers 306 are associated with the rack in which the jacks are found, each individual jack is found by triangulation to those locations, as discussed above. In the embodiment shown, the overlay information 500 includes information about the asset associated with the identifiers 306 (i.e. the rack 300, as shown by "Rack ID: 0001"), and also includes identifying a location and a label for one or more sub-assets (e.g., the telecommunications jacks 304 labeled "Port ID 24" and "Port ID 36" shown in FIG. 5). These can include, for example, CPID codes for each asset or sub-asset that is tracked. In some embodiments, the overlay information 500 includes instructions for providing service to the network assets, such as by disconnecting and reconnecting network assets. Other types of service or operational information could be described in the overlay information as well, such as insertion counts, cable length, cable category (e.g., Category 5, Category 6, etc.) and other types information such as those listed above.

Preferably, the display of both image data and overlay data is provided in realtime or near realtime with capture of the video image data. This will allow the technician to move the mobile device, allow the locations of network assets to be recomputed, and the display and overlay information updated as the mobile device changes position. In alternative embodiments, the overlay information and image data can be still image data and static overlay information. Other arrangements are possible as well.

Referring to FIG. 6, in this example, the display 400 presents to the user an interface including overlay information 600 that includes labels for the various types of identified equipment included in the illustration. In this example, an overlay label 602 can be included, either upon selection of the device type button 402*a*, or in response to tapping on the display in a location where the device is displayed, to show the identity of the device, including a device type, software version (if applicable, such as in the case of a managed panel), manufacturer, manufacture date, and any associated alarms. In addition, in some embodiments, other information associated with the device can be displayed. For example, in FIG. 7, overlay information 700 can include a detailed information area 702 that displays routing and type information associated with the asset being identified. For example, the detailed information area 702 can display information about routing from a panel, such as an identifier of another panel to which the current panel is connected, which may not be depicted on the display 400. Additionally, various misconfigured or error-state systems can be highlighted by accessing error reports stored at the server 110 when generating the overlay information 702.

In some example embodiments, the additional information associated with the asset in the detailed information area 702 can include a textual or graphical description of a full routing arrangement including the particular asset (e.g., a connection or panel), from a host to a switch, from a switch to a switch or router, or some other type of communicative connection. Such additional information can include display of current connections of assets, or particular predicted connections based on a planned result of a work order. In some embodiments, the additional information can be presented in the form of a text overlay, or alternatively a routing diagram allowing the user to visualize the interconnections that are to be made.

In accordance with the display 400 shown in FIGS. 4-7, it is noted that a variety of other types of information could be presented to a user who laps on an asset or one of the buttons 402*a-d* shown on the display 400. For example, a user can tap on a particular asset that is a device to display warranty information associated with the device, or to get further information about the panel or blade, or port of such a device, by tapping on the device itself. Additionally, for technicians who wish to fulfill work orders, supplemental information can be presented to the user as well, such as instructional videos or diagrams that illustrate hop/to accomplish various routing end/or maintenance tasks.

It is also noted that, although in the embodiments described herein specific types of information are depicted, a user of a mobile device 102 in accordance with the present disclosure can also provide feedback for storage in database 108, for example work order or asset identification information. For example, a user of a mobile device 102 can, in some embodiments, tap on the display to define interconnections between equipment that should be made, thereby creating one or more work orders for other technicians to execute. Additionally, options can exist for a user to select and reset one or more settings of a particular device via remote control through server 110 at the network management facility.

Figure 8:
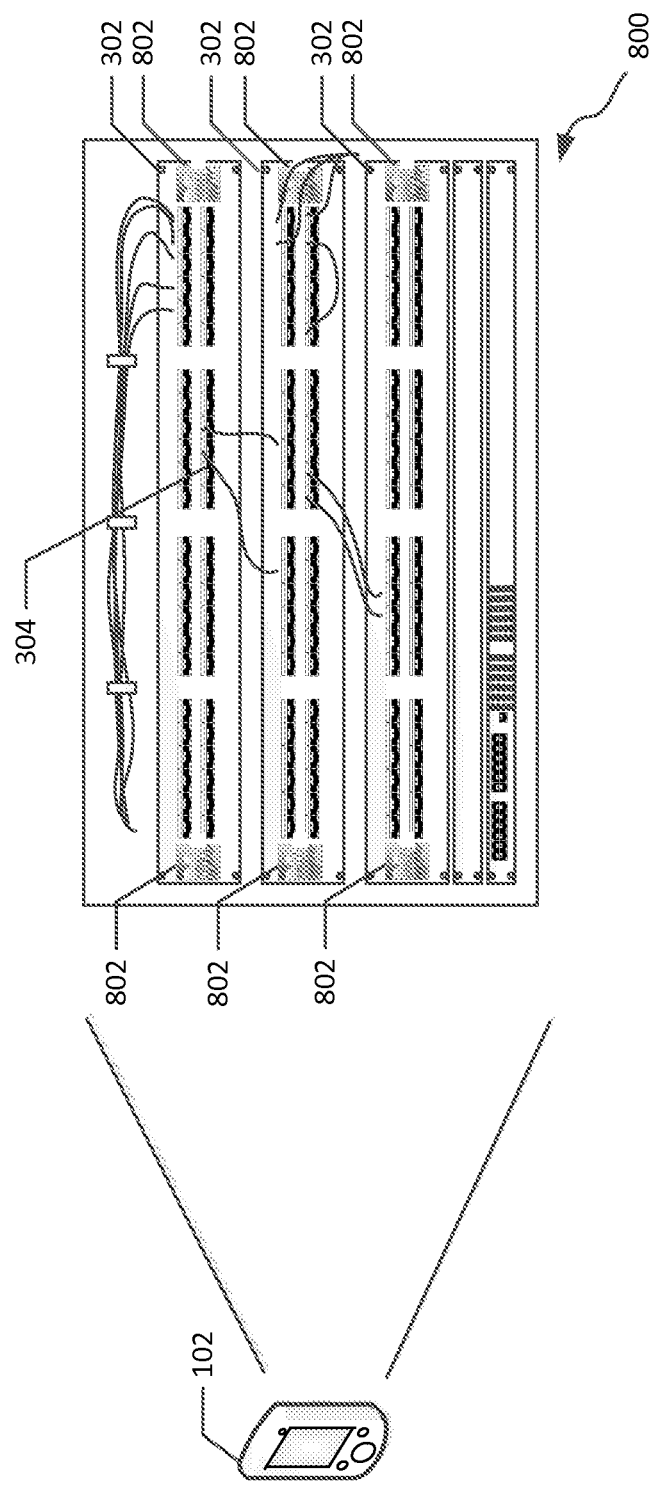
FIG. 8 is a schematic diagram illustrating an example arrangement for tracking network assets, according to a second possible embodiment of the present disclosure.

Referring now to FIG. 8, an alternative embodiment of an arrangement 800 for tracking network assets is shown. The arrangement 800 could be used in place of arrangement 300, but includes different types and arrangements of identifiers used in connection with specific network assets. In particular, in the embodiment shown, each patch panel 302 has an associated set of identifiers 802 placed on opposing sides of an array of connectors 304, which can reduce complexity in triangulating to calculate the position of a particular asset (e.g., a jack) when generating overlay information 500. In various embodiments, different images 802 can be used on each panel 302 (or different images can be used on opposite sides of the same panel), to assist in uniquely identifying a network asset. It is understood that analogous overlay information to that illustrated in FIG. 5 could be generated for association with the arrangement 800 of FIG. 8, using the images 802 within the arrangement 800 to determine relative positions of assets.

In still further embodiments, one or more additional images could be placed on the panel 302 or other assets, such that each tracked asset has an associated unique image. For example, a separate, unique image could be located on each panel associated with each connector 304, or in combination with an LED or bar code arrangement, to identify an asset, such that reduced triangulation calculations would be required (i.e., each image could be placed in a predetermined or known location relative to the asset).

Figure 9:
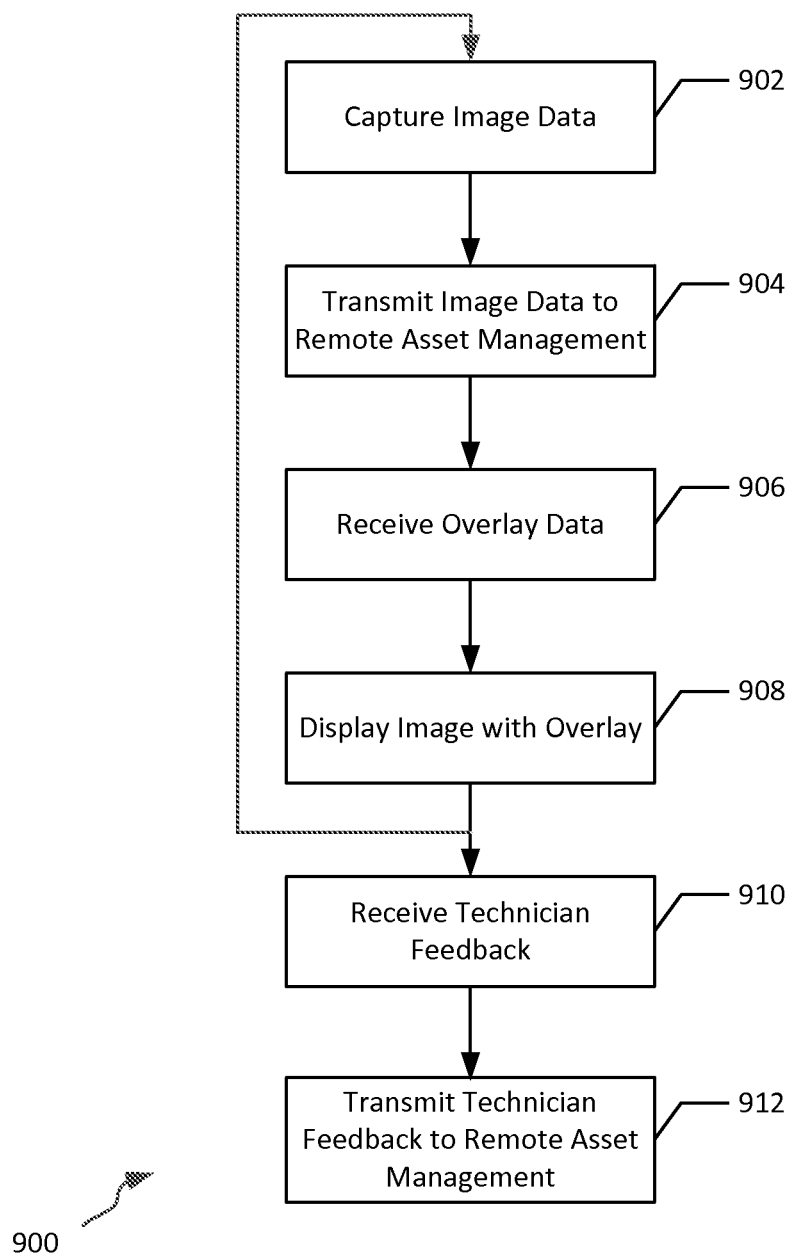
FIG. 9 is a flowchart of methods and systems for tracking network assets using a mobile device, according to a possible embodiment of the present disclosure.
Figure 10:
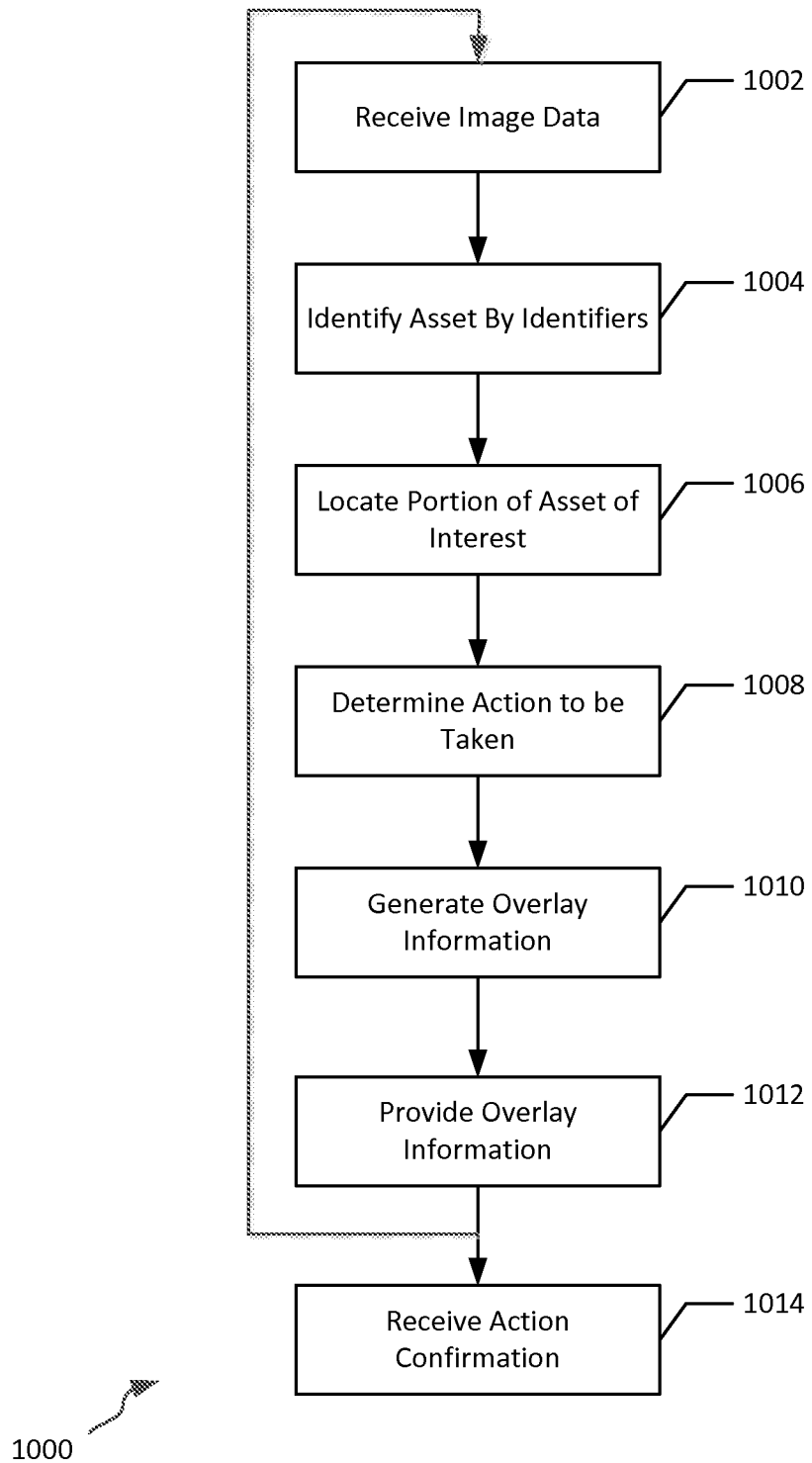
FIG. 10 is a flowchart of methods and systems for tracking network assets using a mobile device and/or a network assert tracking engine and database remote from the mobile device, according to a further possible embodiment of the present disclosure.

Referring now to FIGS. 9-10, methods of tracking and identifying network assets are described, using the structures and information described above in connection with FIGS. 1-8. FIG. 9 is a flowchart of a method 900, as may be performed or implemented using software systems of a mobile device, for tracking network assets using a mobile device, according to a possible embodiment of the present disclosure. The methods and systems illustrated in FIG. 9 can be performed using any of a number of embodiments of a network asset location system as discussed above in connection with FIGS. 1-8.

In the embodiment shown, the method 900 begins with capture of image information (e.g., still or video information) using a camera of a mobile device, such as mobile device 102 (step 902). The captured image data is then transferred to a network asset tracking engine 108, either at the mobile device such as device 102, or a server 110 at a remote location 112 (step 904). The mobile device then receives overlay information, either generated locally on the mobile device or remotely at the server 110, but in either event generated within the network asset tracking engine 108 (step 906). A display operation generates a display of the image including a network asset and overlay information highlighting the location and identity of the network asset, as well as optionally other information, such as identities and locations of other network assets, or actions to be taken by a technician to service the network asset, such as is shown in FIG. 5 (step 908).

In certain embodiments, the method 900 can include receiving feedback from the technician, for example to log services or configurations performed by the technician. In such embodiments, a technician may input into the mobile device information regarding the specific services provided to the network asset (step 910). In embodiments in which a remote server is used to track such technician activity, the received input from the technician regarding services performed can be communicated to the server to be logged (step 912).

FIG. 10 is a flowchart method 1000 for tracking network assets using a mobile device and/or a network asset tracking engine and database remote from the mobile device, according to a further possible embodiment of the present disclosure. The methods in FIG. 10 may be performed or implemented using software systems of a server, a mobile device, or both systems.

In the embodiment shown, the network asset tracking engine 108 receives image information captured by a mobile device (step 1002). This can occur, for example, within the mobile device, or based on transmission of that image data from a mobile device to a server on which the network asset tracking engine resides. The image analysis module 204 of the network asset tracking engine 108 (as shown in FIG. 2) can analyze the received image data, and identify one or more network assets identifiable within the image data, for example by decoding information communicated by way of the asset identifiers associated with a particular asset (step 1004). This can include, for example, decoding a bar code or QR code, or detecting a code communicated by a strobed LED, as well as recognizing a particular image or images placed in association with the asset. Other configurations are possible as well.

A network asset can then be located within the image data, for example based on triangulation from the identifiers that are identified, and based on information regarding relative positions of the asset and identifiers as maintained in database 202 (step 1006). An action to be taken is determined (step 1008) for example based on pre-programmed indication of necessary service to be performed on a particular network asset, or based on user definition of a new work order that is to be created associated with the asset, as received from the mobile device 102. Overlay information is then generated (step 1010) and provided to the display of the mobile device (step 1012), to communicate the identification and location of the network asset to the technician, or to communicate various other information to the technician as required for interaction with the asset (e.g., warranty, error, status, or instructional information, as explained above).

In embodiments such as those discussed above in which feedback is received from a technician regarding service actually performed, the network asset tracking engine 108 can receive feedback information (step 1014), and can store that information, for example in action log 210.

As illustrated in both FIGS. 9-10, it is noted that once overlay information is provided to a mobile device, the mobile device may obtain additional image data (e.g., due to capture of video data, or a subsequent image). In such an event, the user of the mobile device may have changed the location of the mobile device, such as by switching its focus, moving the device closer to or further from the assets to be identified, or other movements. In such instances, the present application provides for continual (or periodic) updating of overlay data as image data is received from the mobile device. As seen in FIG. 9, that method could restart with a subsequent image capture (step 902) after displaying image and overlay data (step 908). In FIG. 10, additional image data could be received and processed (step 1002 et seq.) following providing overlay data from the server (step 1012). This can include, for example, retargeting on a different network asset, or retargeting on the same network asset in an image having a different focus (e.g., with one or both of the asset or identifiers moving within the image).

Referring now to FIGS. 9-10 generally, in additional embodiments, other steps, or different orders of steps, can be performed by the mobile device and/or server. Additionally, other devices could be used as well; for example multiple technicians can simultaneously access a server using different mobile devices, or multiple servers, each of which are configured to provide different services (e.g., managing a network asset database, calculating triangulated positions of network assets based on received image data, or other features). Furthermore, and as discussed above, based on various embodiments of the mobile device, the overlay of information can correspond to either storage of a captured image and addition of supplemental, guidance information to that image prior to display, or display of such supplemental data on a semi-transparent display associated with a scene in a field of view, for example using a heads-up display or other type of display associated with a wearable device.

Now referring to FIGS. 11-17, additional embodiments are discussed in which assets can be located and managed, for example using other types of mobile devices. In some embodiments discussed herein, the mobile devices used according to the embodiments of FIGS. 11-17 represent hands free, wearable display devices. In example embodiments, such devices can include eyewear, such as Google Glasses from Google, Inc. of Mountain View, Calif., M100 Smart Glasses from Vuzix Corp. of Rochester, N.Y., or other types of overlay-based eyewear capable of displaying information in a field of view of a wearer. As is recognized, such wearable display devices generally include installable applications, resident in memory, that can utilize video or image capture features of such devices as well as wireless communication capabilities of such devices. As discussed in further detail below, these or other types of wearable display devices could be used as well, to provide for hands-free operation of directions and instructions by a technician, thereby simplifying and making more reliable any maintenance performed by such technicians.

In accordance with the present disclosure, such wearable devices may include other functionality that may be displayed to the user as well. For example, in some cases, a barometer may be used to detect altitude (e.g., to determine a current floor of a building where the wearer is located), a gyroscope to determine movement, or other types of functionalities that can generate data relevant to the user and displayed in the overlay.

Figure 11:
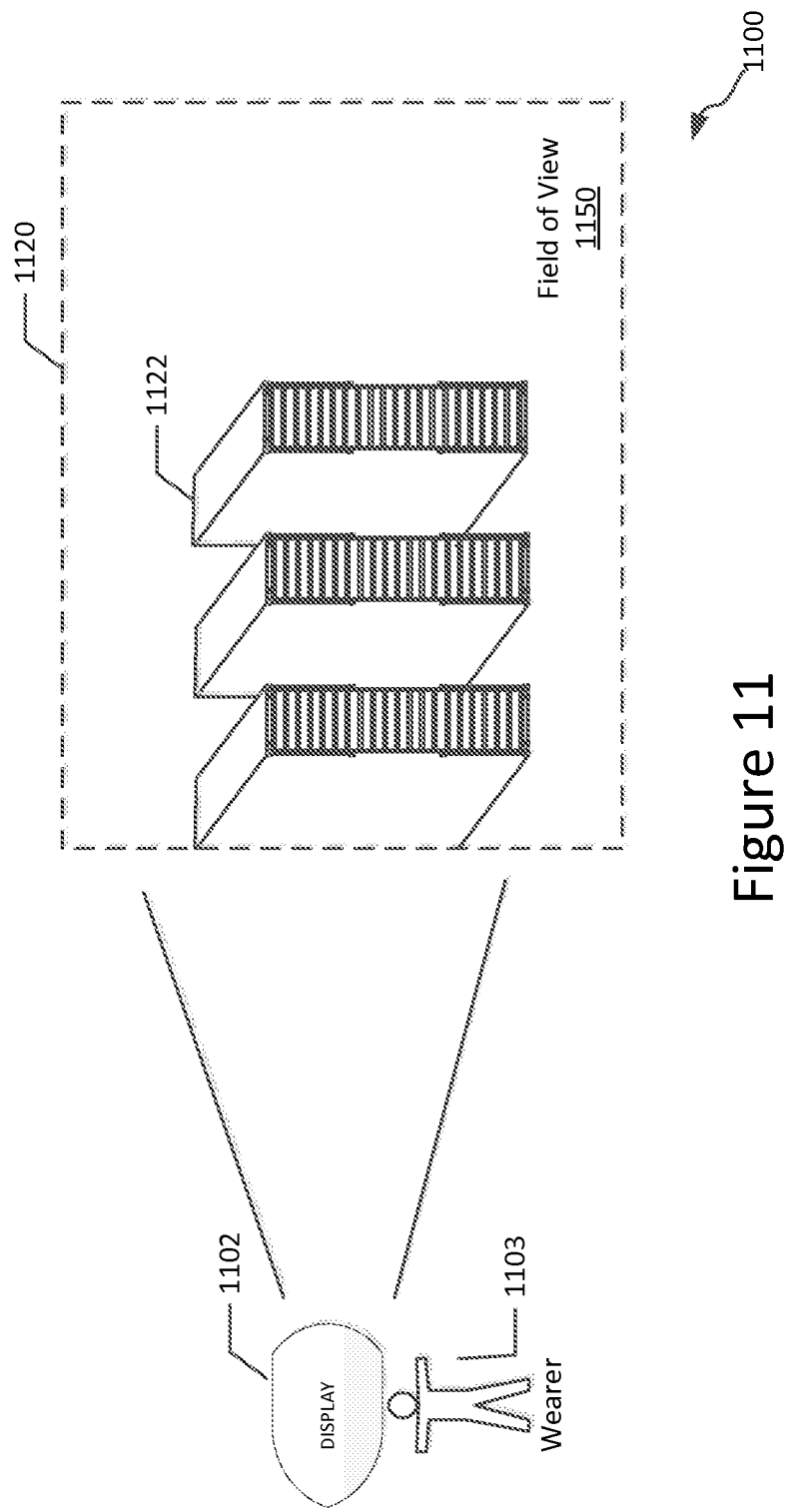
FIG. 11 is a schematic diagram illustrating an example arrangement for hands-free management of network assets using a wearable display device, according to a possible embodiment of the present disclosure.

Generally, and as referring to FIG. 11, an arrangement 1100 is illustrated in which a wearer 1103 has a wearable display device 1102, to view a field of view 1150. Within the field of view 1150, the wearer 1103 views a scene 1120 that includes a plurality of objects, such as assets 1122 (e.g., racks, as shown, or any other types of assets discussed above).

Figure 12:
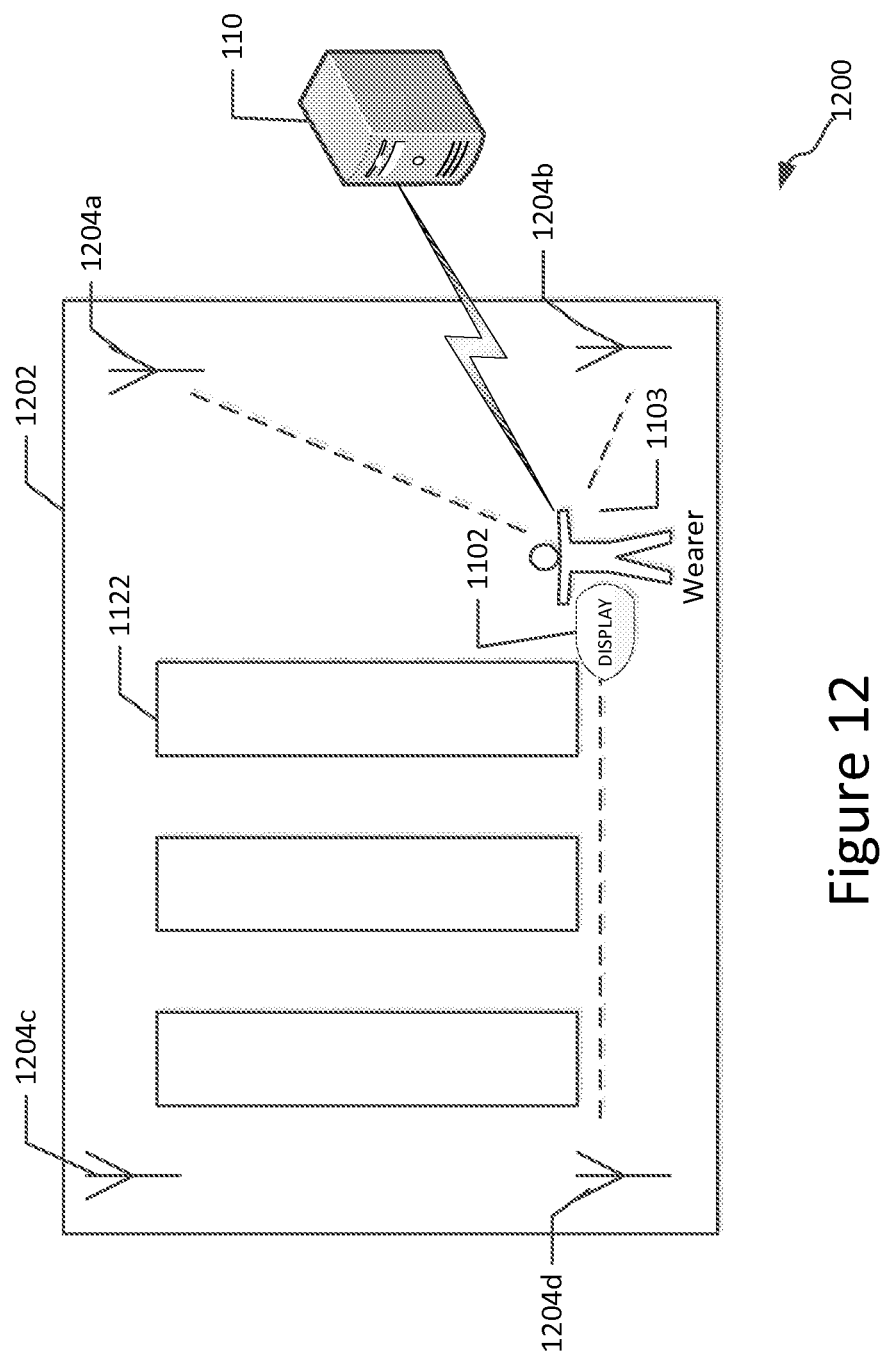
FIG. 12 is a schematic diagram illustrating an example locating process for a wearable display device within a facility, according to aspects of the present disclosure.
Figure 13:
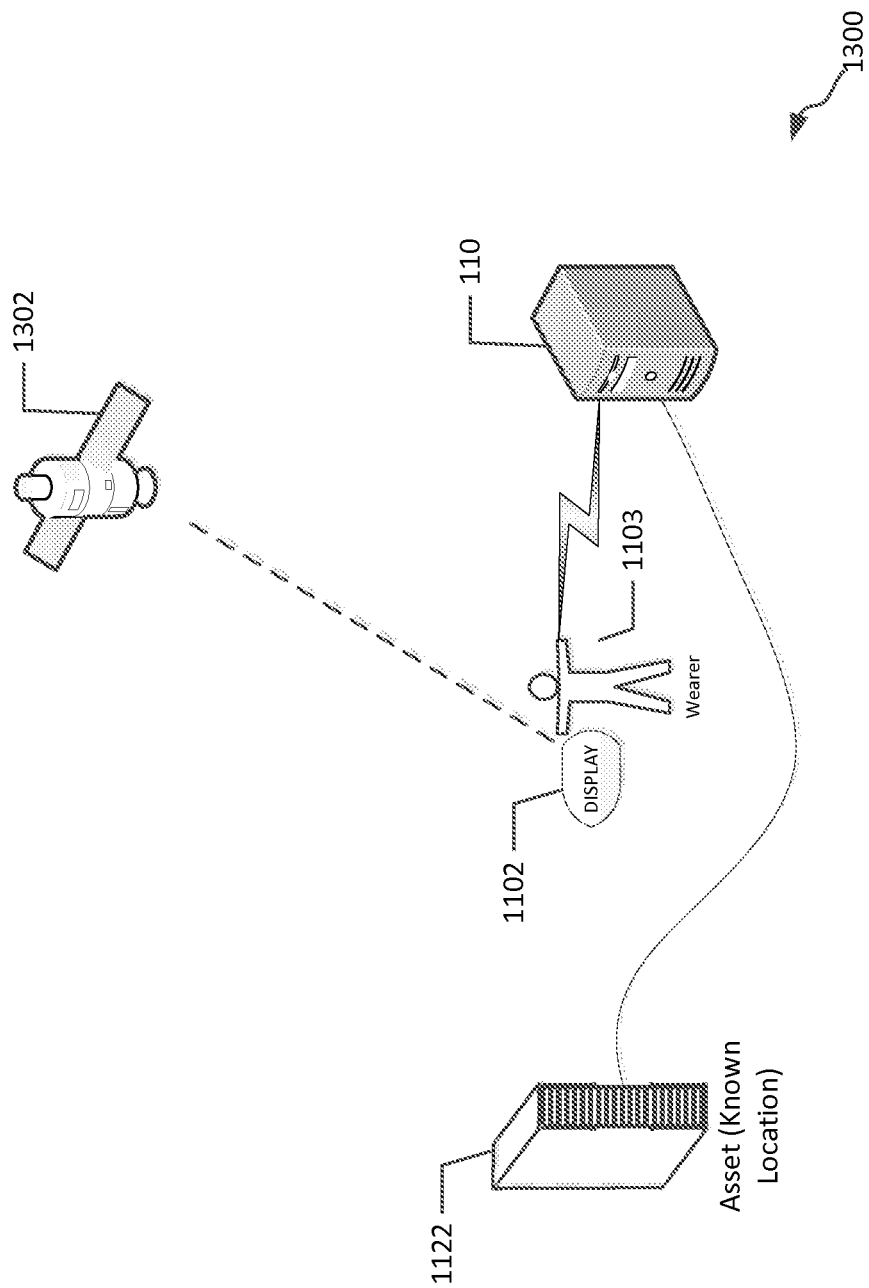
FIG. 13 is a schematic diagram illustrating an example locating process for a wearable display device outside of a facility, according to aspects of the present disclosure.
Figure 14A:
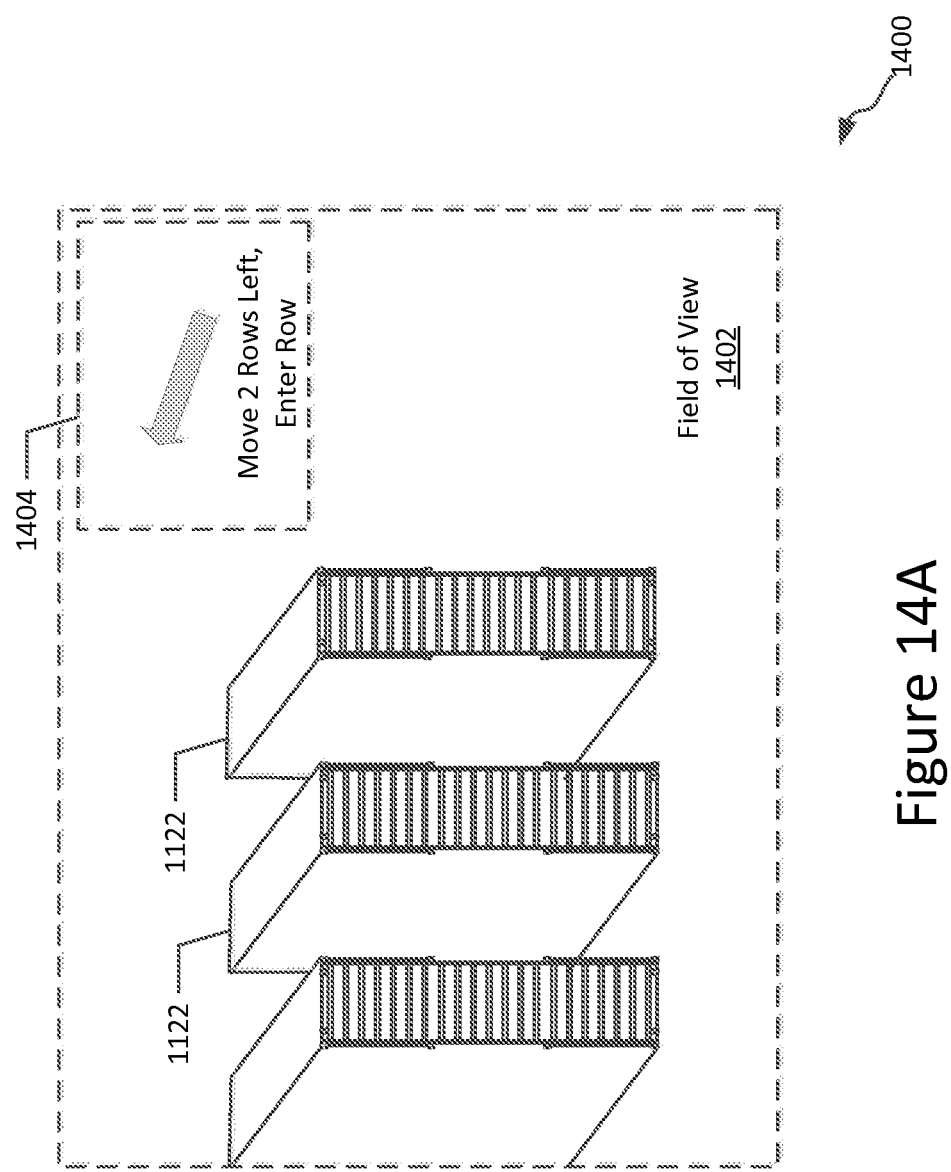
FIG. 14A illustrates an example direction service provided by an application executing on a wearable display device, according to an example embodiment of the present disclosure.
Figure 14B:
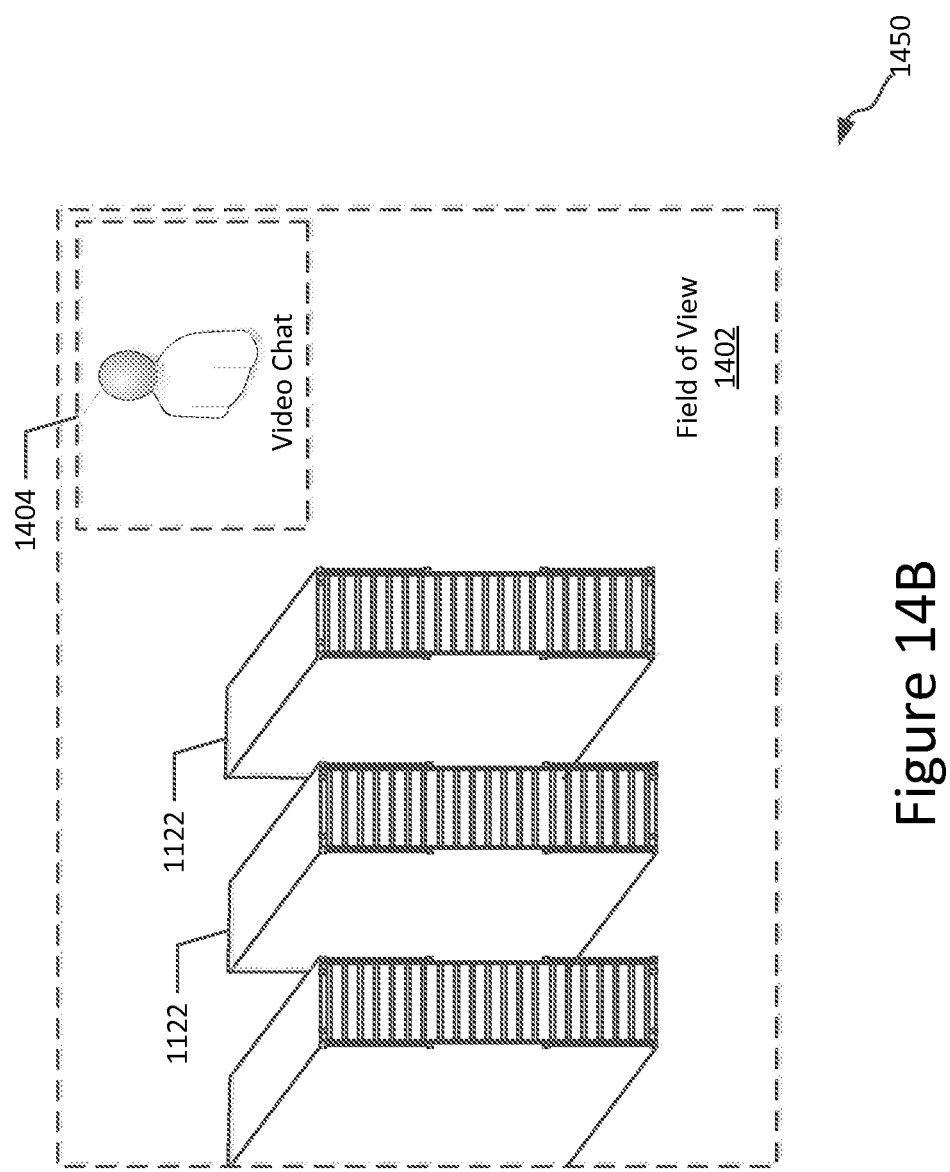
FIG. 14B illustrates an example video chat provided by an application executing on a wearable display device, according to an example embodiment of the present disclosure.
Figure 15:
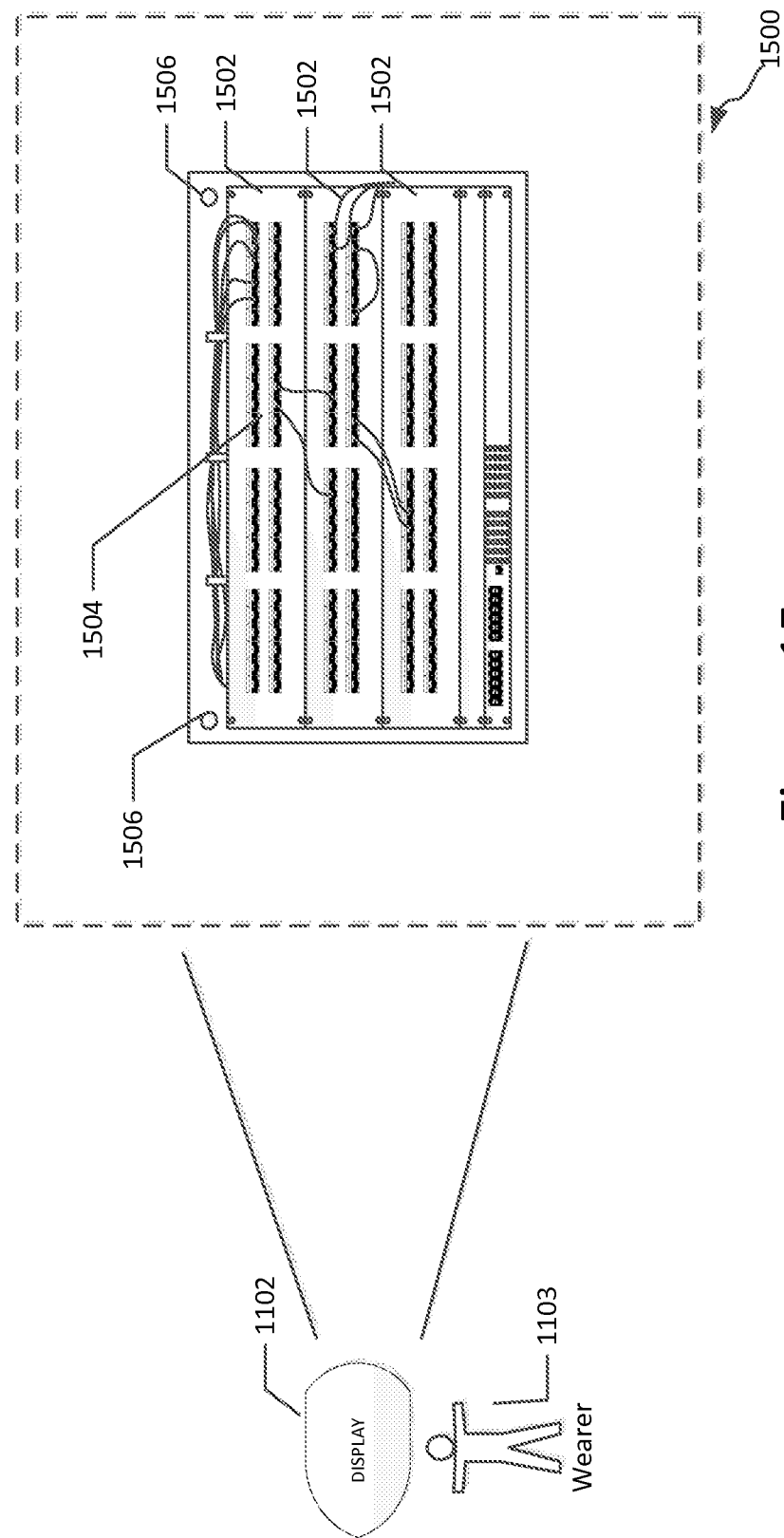
FIG. 15 is a schematic diagram illustrating an example asset identification process using a wearable display device, according to aspects of the present disclosure.
Figure 16:
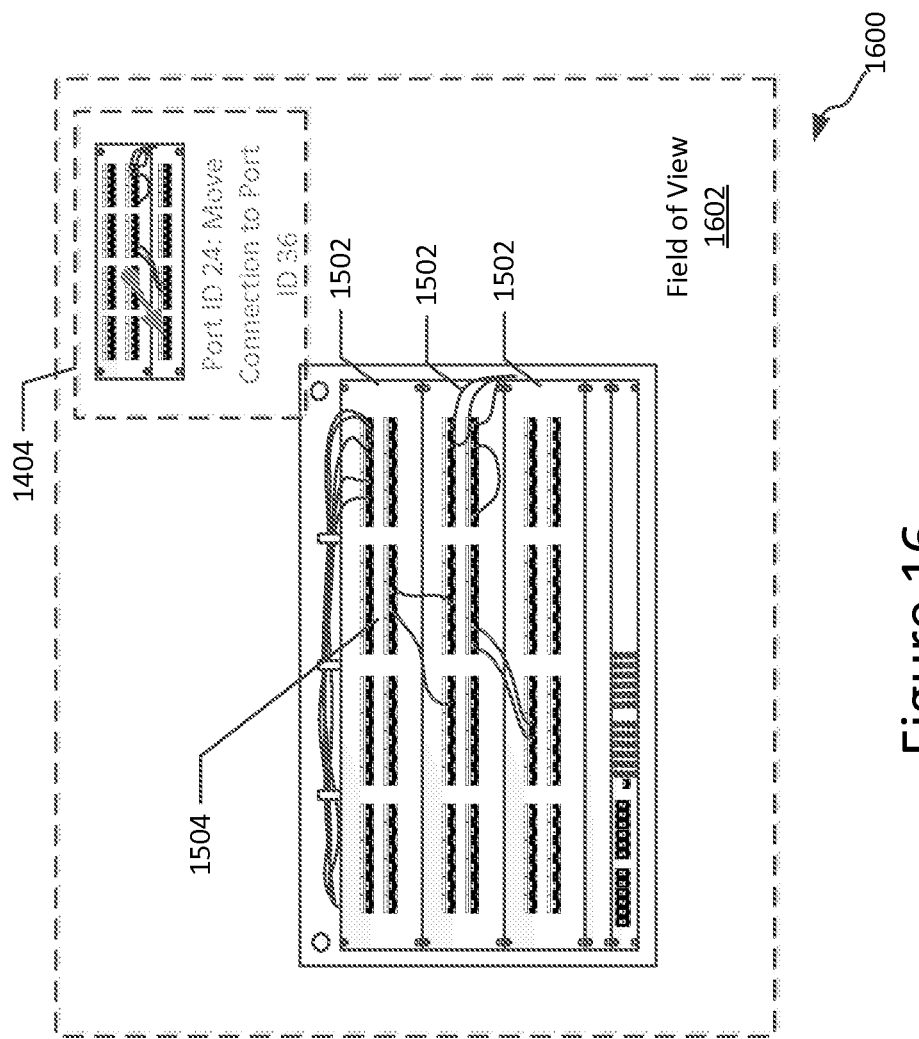
FIG. 16 illustrates an example work instruction included in a work order received at a wearable display device according to example aspects of the present disclosure.
Figure 17:
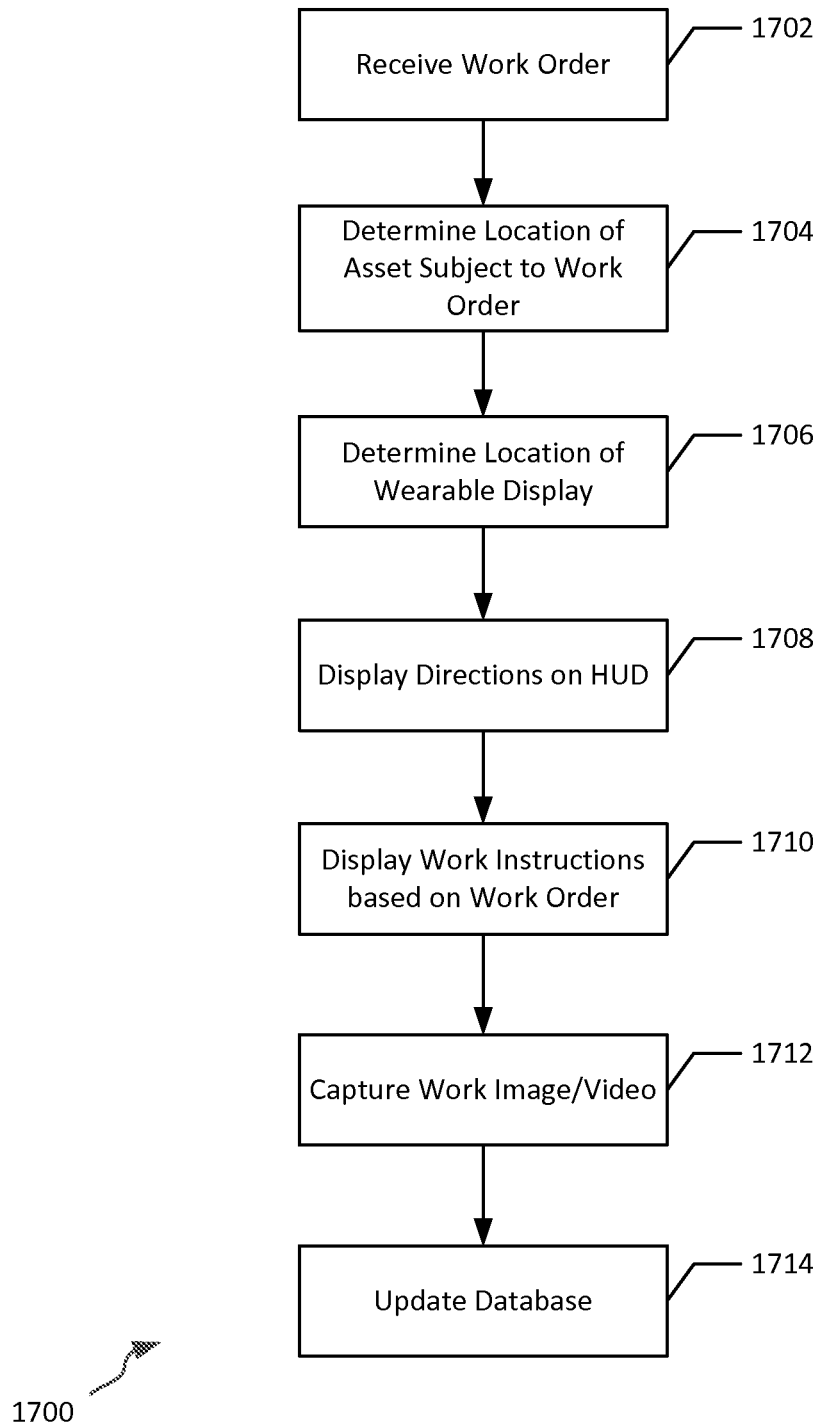
FIG. 17 is a flowchart of an example method of tracking networking assets in a hands-free manner using a wearable display device, according to an example embodiment of the present disclosure.

Generally, using the hands-free wearable display device arrangement of FIGS. 11-17, the wearer 1103 (typically a technician) may be guided in a number of ways to ensure that correct actions are taken. For example, and as shown in FIGS. 12-14, the wearer 1103 may be presented directions, such as "turn-by-turn" directions to a particular asset to be addressed and configured. Additionally, and as shown in FIGS. 15-16, the wearer 1103 may be presented with a heads-up display presenting instructions used to fulfill a work order received at the wearable display device. An overall process is discussed in FIG. 17, below.

Referring to FIGS. 12-13, different location features are discussed. FIG. 12 illustrates an arrangement 1200 location of a wearable display device 1102 and a desired asset 1122 when within a facility 1202 (e.g., when inside a building). In this arrangement, a plurality of WiFi routers 1204*a-d* are included, and the wearable display device 1102 or network to which it is connected to triangulate that device's position based on a strength and/or directionality of signals at each device. In the embodiment shown, connection strength to routers 1204*a-c* provides a general location of the device 1102, which can communicate that location to a server 110 (or can alternatively receive a relative location of a desired asset from server 110). Based on that information, and the relative positions between the wearable display device 1102 and the asset 1122, directions can be provided. By way of contrast, and as shown in FIG. 13, in an outdoor arrangement 1300, the wearable display device 1102 need not connect to or triangulate from WiFi routers 1204, but rather can directly communicate with a GPS satellite 1302.

Referring to FIGS. 14A-B, example schematic arrangements 1400, 1450 are shown in which a field of view 1402 is depicted that corresponds to the arrangements of FIGS. 11-13. In this arrangement, however, a heads-up display is overlaid in a region 1404 toward a periphery of a user's field of view. In the examples shown, the region 1404 is at a location to an upper right of the user's field of view; however, other arrangements are possible.

In the examples shown in FIGS. 14A-B, the region 1404 can display various messages to a user. For example, in the example of FIG. 14A, the region 1404 displays "turn by turn" directions allowing a wearer of a wearable display device to navigate directly to an asset to be addressed. Notably, this may be based on the wearable display device comparing a known location of an asset to a current location of the wearer, or communication of the current location of the wearer to a remote system, such as server 110, which can in turn calculate and transmit back to the wearable display device 1102 directions for use by the wearer 1103. In the example of FIG. 14B, a user can enter a real-time voice or video chat session with another user in region 1404, for example to receive instructions or clarification regarding a work order to be completed, or to describe a particular circumstance/complication in performing the work order, or report completion of a work order.

Beyond the examples of FIGS. 14A-B, it is noted that other overlay information can be displayed in the region 1404, consistent with the types of information discussed herein as representing overlay information. For example, routing diagrams or other illustrative instructions or video information can be presented to allow the user to visualize the steps to be performed in completing a work order or maintenance task.

As seen in FIG. 15, a schematic diagram 1500 illustrating an example asset identification process using a wearable display device is shown. The example of FIG. 15 corresponds generally to that described above in connection with FIG. 3, in which a camera component of a device (in this case, the wearable display device 1102) can identify one or more assets or sub-assets for maintenance or technician services. This can be based on an identification of various components, such as patch panels 1502 and associated telecommunications jacks 1504.

As seen in FIG. 16, an arrangement 1600 presents within a field of view 1602 a heads-up display region 1404, as discussed above. However, in this case, the region 1404 displays step by step directions for accomplishing the work order as prescribed.

Generally, and referring to FIGS. 11-17 generally, a method 1700 is disclosed in which a technician wearing a wearable display device having an application stored thereon according to the present disclosure can cause the device to receive a work order (step 1702), which includes one or more instructions for reconfiguring networking assets.

The method 1700 includes determining a location of an asset subject to a work order, for example by accessing a location of that asset as registered in a database (step 1704). The method 1700 also includes determining a location of the wearable display device (step 1706), which can include, for example, either using GPS or some WiFi-based triangulation arrangement. A comparison of those two locations can be performed at either of the server 110 or the device 1102.

Once the comparison is performed and a difference between those locations computed, one or more displayable directions are presented to the user, for example provided in a heads-up display to allow for hands-free navigation to an asset of interest. Once at that asset, the wearable display device 1102 can recognize that the asset is present (e.g., using the same types of techniques discussed above) (step 1708), and can display, in a step-by-step process, the one or more functions or steps required to complete a work order, i.e., presenting work instructions to the wearer 1103 (step 1710). In some cases, presenting work instructions to the wearer 1103 can include a large number of steps, and can include display of scenario information, such as the end effect of a particular work order step or overall process.

As the wearer 1103 is performing the work instructions displayed, optionally the wearable display device can also be used to capture images and/or video of the technician's work and transmitting that back to the server, e.g., for storage in the technician action logs 210 of the network asset tracking engine and database 108 (steps 1712, 1714) for validation purposes.

Referring to FIGS. 1-17 generally, it is noted that the methods discussed herein provide for improved reliability of network asset operation due to a reduced probability of incorrect maintenance or configuration being performed. Furthermore, because in the embodiments of FIGS. 11-17 the device used is wearable (e.g., eyewear or wristwear), such devices allow for hands-free maintenance and/or configuration, and therefore save time by simplifying and making more natural a technician's operations.

Further, although discussed in terms of asset location and maintenance in telecommunications networks, it is noted that the systems and methods of the present disclosure may have applicability in other contexts in which work orders or other types of network management tasks are required. For example, various energy distribution, data communication, broadband network solutions, or other applications may be possible in which installation and handling of products in the field by a technician may similarly utilize such a system.

Additionally, and referring now to FIGS. 1-17 generally, it is recognized that although the terms "mobile device" and "server" are used herein, it is recognized that any of a variety of types of computing devices could be used. Generally, the network asset tracking engine is implemented as software modules executable on a programmable circuit, such as a microprocessor. The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

Through use of the systems and methods described herein, reliable identification of specific assets and actions required for configuration of network assets is provided, thereby reducing erroneous connections or configurations of networking equipment and attendant downtime due to additional maintenance and correction of network asset configurations that might otherwise be required.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An asset management system comprising:
   an asset tracking database storing an asset location and one or more identifying characteristics of each of a plurality of networking assets;
   a first position location arrangement used outdoors;
   a second position location arrangement used inside a building;
   an application executable on a display device communicatively connected to the asset tracking database, the application executable to:
   receive a work order associated with at least one asset among the plurality of networking assets;

based on a current location of the display device determined by one of the first position location arrangement and the second location arrangement and the at least one asset associated with the work order, display one or more directions to the asset; and display one or more work instructions to be performed on the asset; and wherein the application is further executable to capture at least one of an image and video of work while the one or more work instructions are performed with a camera of the display device for validation purposes.

2. The asset management system of claim 1, wherein the asset tracking database is hosted by a server remotely located from and communicatively connected to the display device.

3. The asset management system of claim 1, wherein the display device provides a heads-up display at a periphery of a field of view of a user wearing the display device.

4. The asset management system of claim 3, wherein the application is further executable to identify the at least one asset to which the one or more work instructions are to be performed on the heads-up display.

5. The asset management system of claim 1, wherein the application is executable to display a status of the identified at least one asset.

6. The asset management system of claim 1, wherein the application is further executable to generate a work order through the display device.

7. The asset management system of claim 1, wherein the at least one asset is located within a building, and wherein the application uses the second position location arrangement to identify a current location of the display device relative to the at least one asset.

8. The asset management system of claim 1, wherein the at least one asset is located outside of a building, and wherein the application uses the first position location arrangement to identify a current location of the display device relative to the at least one asset.

9. The asset management system of claim 1, wherein the at least one asset is selected from the group consisting of:
a network connectivity element;
a patch panel
a network switch;
a subrack;
a network blade;
a rack system;
a broadband network solution component; and
an energy distribution component.

10. The asset management system of claim 1, wherein, upon receiving confirmation from the display device of completion of the work instruction, communicating an updated status of at least one of the work order and the at least one asset to the asset tracking database.

11. The asset management system of claim 1, wherein wherein identifiers used in the image based identifier system include at least one bar codes, QR codes and images that are unique and associated with an asset.

12. An asset management system, comprising:
an asset tracking database storing an asset location and one or more identifying characteristics of each of a plurality of networking assets;
a first position location arrangement used outdoors;
a second position location arrangement used inside a building;
an application executable on a display device communicatively connected to the asset tracking database, the application executable to:

receive a work order associated with at least one asset among the plurality of networking assets;
based on a current location of the display device determined by one of the first position location arrangement and the second location arrangement and the at least one asset associated with the work order, display one or more directions to the asset; and display one or more work instructions to be performed on the asset; and
wherein the application is further executable to allow at least one of a web interface to view operational parameters of the at least one asset and a real time one of a voice and video chat communication link to discuss the work order.

13. A method of tracking networking assets, the method comprising:
receiving, at an application executing on a display device, a work order associated with at least one asset among a plurality of networking assets stored in an asset tracking database, each of a plurality of records associated with the plurality of networking assets including an asset location and one or more identifying characteristics of that asset;
determining a location of the display device with at least one of a first position location arrangement used outdoors and a second location arrangement used indoors, both the first and second location arrangements are available for use with the display device;
based on the determined location of the display device and the work order, overlaying turn-by-turn directions to the asset on the display device;
displaying one or more work instructions to be performed on the asset based on the work order;
capturing at least one of an image and video of work while the one or more work instructions are performed with the display device; and
storing the captured at least one of an image and video of work while one or more of the work instructions are performed in a technician action log.

14. The method of claim 13, further comprising capturing image data associated with the one or more assets before the one or more work instructions are performed.

15. The method of claim 13, wherein displaying the one or more directions comprises displaying turn-by-turn directions to the at least one asset.

16. The method of claim 13, further comprising transmitting a location of the display device to a server hosting the asset tracking database, wherein the server calculates the one or more directions from the location of the display device to the location of the at least one asset.

17. The method of claim 13, wherein at least one of the first and second position location arrangements further comprises one of:
calculating a location of the display device within a building using a WiFi triangulation system and:
applying GPS techniques.

18. The method of claim 17, further comprising calculating a vertical location of the display device within the building using a barometer.

19. A display device to manage networking assets comprising:
a memory;
an application including a plurality of executable instructions stored in the memory of the display device which, when executed, cause the wearable display device to perform a method comprising:

receiving a work order associated with at least one asset among a plurality of networking assets stored in an asset tracking database, each of a plurality of records associated with the plurality of networking assets including an asset location and one or more identifying characteristics of that asset;

based on a location of the display device and the work order, displaying one or more directions to the asset for a wearer of the display device; and displaying one or more work instructions to be performed on the asset based on the work order;

a camera to take at least one of images and video, the application further configured to cause the camera to capture at least one of an image and video of work while one or more of the work instructions are performed and send the captured at least one of an image and video to a remote server for verification; and an interface, the application further configured to allow the creation of a work order when the interface is activated.

* * * * *